(12) United States Patent
Mok et al.

(10) Patent No.: US 8,542,708 B1
(45) Date of Patent: Sep. 24, 2013

(54) METHOD AND SYSTEM FOR TRANSPORTING CONSTANT BIT RATE CLIENTS ACROSS A PACKET INTERFACE

(75) Inventors: Winston Ki-Cheong Mok, Vancouver (CA); Karl Scheffer, Vancouver (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 423 days.

(21) Appl. No.: 12/795,363

(22) Filed: Jun. 7, 2010

Related U.S. Application Data

(60) Provisional application No. 61/265,241, filed on Nov. 30, 2009.

(51) Int. Cl.
*H04J 3/06* (2006.01)

(52) U.S. Cl.
CPC ............ *H04J 3/0685* (2013.01); *H04J 3/0664* (2013.01)
USPC ............... 370/503; 370/506; 709/233; 398/58

(58) Field of Classification Search
USPC ........... 370/474, 503, 506; 398/58; 713/502; 709/233
See application file for complete search history.

(56) References Cited

U.S. PATENT DOCUMENTS

| | | | |
|---|---|---|---|
| 5,260,978 A | | 11/1993 | Fleischer et al. |
| 6,829,717 B1* | | 12/2004 | Roust ........................... 713/502 |
| 2003/0152076 A1* | | 8/2003 | Lee et al. ...................... 370/389 |
| 2006/0159130 A1* | | 7/2006 | Den Hollander et al. ..... 370/503 |
| 2006/0159169 A1* | | 7/2006 | Hui et al. .................. 375/240.03 |
| 2007/0126612 A1* | | 6/2007 | Miller ............................. 341/67 |
| 2007/0162780 A1* | | 7/2007 | Wang et al. .................... 713/600 |
| 2008/0212619 A1* | | 9/2008 | Scott et al. ..................... 370/503 |
| 2009/0041028 A1* | | 2/2009 | Kramer .................... 370/395.62 |
| 2010/0209107 A1 | | 8/2010 | Yin |
| 2010/0226652 A1 | | 9/2010 | Vissers et al. |

OTHER PUBLICATIONS

ITU-T G.709/Y.1331, Interfaces for the Optical Transport Network (OTN), International Telecommunication Union, Mar. 2003, 118 pages.
ITU-T G.8251, Control of Jitter and Wander within the Optical Transport Network (OTN), International Telecommunication Union, Sep. 2010, 124 pages.
ITU-T G.7041/Y.1303, Generic Framing Procedure (GFP), International Telecommunication Union, Oct. 2008, 79 pages.

* cited by examiner

*Primary Examiner* — Ricky Ngo
*Assistant Examiner* — Richard K Chang
(74) *Attorney, Agent, or Firm* — Dennis R. Haszko

(57) ABSTRACT

A method and apparatus are described for signaling the phase and frequency of constant bit rate (CBR) clients over a network or fabric. An incoming CBR client stream is segmented into variable sized segments, such as packets or general framing protocol (GFP) frames, and is regenerated on the other side of a fabric or network phase-locked to the incoming stream. Regeneration of the CBR client clock is based solely on segment sizes, and in the case of GFP frames, the rate of the SONET Path or OTN ODUk stream carrying the GFP frames. No overhead bytes are inserted into the GFP frames to convey phase and frequency information. The method disclosed is important for reducing the cost and complexity of communications networks by allowing CBR clients to be transported with low jitter and wander without requiring the source and sink network elements to be phase-locked to a common stratum reference.

22 Claims, 18 Drawing Sheets

METHOD AND SYSTEM FOR TRANSPORTING CONSTANT BIT RATE CLIENTS ACROSS A PACKET INTERFACE

CROSS REFERENCE TO RELATED APPLICATIONS

This application claims priority to U.S. Provisional application 61/265,241 filed Nov. 30, 2009 which is herein incorporated by reference in its entirety.

FIELD

The present disclosure relates generally to the Constant Bit Rate (CBR) client signals. More particularly, the present disclosure relates to the transmission of a constant bit rate client signal across a packet interface, in which the process of converting the constant bit rate client signal into packets loses the phase information of the constant bit rate client signal.

BACKGROUND

The ITU-T has developed a set of new standards covering wavelengths and signal formats in order to better support the multiplexing of a substantial number of signals onto a single fiber. These signal format and hierarchy standards cover digital signals and include the Operations, Administration, Maintenance and Provisioning (OAM&P) overhead as part of the signal format. In the context of this specification, Optical Transport Network (OTN) refers to networks using the ITU-T Recommendation G.709/Y.1331, Interfaces for the Optical Transport Network (OTN), (03/2003) for Wavelength Division Multiplexed (WDM) signals, the description of which is hereby incorporated by reference in its entirety.

WDM transport networks based on the ITU-T OTN standards are becoming increasingly important. The reasons carriers are moving toward OTN include:
- OTN is a much less complex technology for transport applications than SONET/SDH.
- The OTN signal incorporates overhead optimized for transporting signals over carrier WDM networks.
- The combination of the reduced technology complexity and optimized overhead allows substantial reductions in carrier transport network operations expenses.
- The OTN multiplexing bandwidth granularity is one or two orders of magnitude higher than for SONET/SDH, thus making it more scalable to higher rates.
- OTN now provides a cost effective method for carrying high-speed wide area network (WAN) data clients including Ethernet and storage area network (SAN) protocols.
- OTN provides an integrated mechanism for forward error correction (FEC) that allows greater reach between optical nodes and/or higher bit rates on the same fiber.
- Client signals can be carried over OTN in a transparent manner. This transparency includes native SONET/SDH signals for the "carrier's carrier" application where the entire client SONET/SDH signal's overhead is preserved through the OTN.

In other words, as illustrated in FIG. 1, OTN provides an optimum converged transport technology for transparently carrying important legacy and emerging client signals.

Network elements (NE) within the telecommunications network will need to switch and aggregate CBR clients such as SONET/SDH, STS-N/STM-M, OTN OTUk and video streams and data clients such as Ethernet and Fibre channel. Historically, CBR clients are switched using an asynchronous crossbar, while Data clients are switched by a packet switch. Over the lifetime of a network element (NE, also called a network node), the relative mix of CBR and Data traffic will change. The NE may start out as serving mostly CBR clients and evolve to serving mostly data clients, or vice versa. In order to seamlessly support the above evolutions, an NE with separate CBR and Packet fabrics would have to install 100% bandwidth in both fabrics. It is more cost effective to use a single combined switch fabric that can handle both CBR and Data traffic. Due to the higher growth rate of Data traffic, the current fabric of choice in an NE is a packet fabric.

A packet fabric network element can switch a CBR by receiving a CBR at an Ingress card, which converts the CBR data stream into packets, which are routed to an egress card via the packet fabric. The egress card then reassembles the CBR from the packets and transmits the CBR to a downstream NE. However, the process of converting the CBR data stream into packets loses the phase and frequency information of the CBR, which is a problem as the outgoing CBR must match the phase and frequency of the incoming CBR.

In the application of switching a CBR client through a network element (see FIG. 2), there are a number of known ways to control the transmit clock to be phase-locked to the CBR client.

However, there are problems or disadvantages associated with prior art techniques that have been developed for signaling this phase and frequency information from the Ingress card to the Egress card, so that the Egress card can correctly recreate the CBR from the packets.

One of these prior art methods is to construct packets with fixed amount of CBR client data, transfer the packet through the fabric, and write the CBR client data into a FIFO and read from the FIFO at the transmit clock rate. The transmit clock is sped up or slowed down depending on whether the FIFO depth is above or below an equilibrium threshold. A highly related scheme is to use a phase discriminator to monitor packet arrivals and compare it against the transmit clock. The phase discriminator will get a phase dump equal to the amount of data in each packet as packets arrive. Both of the above schemes are subject to the effects of packet delay variation (PDV). In particular, if the delay through the fabric changes, the transmit clock will experience a phase hit which is seen by the CBR client as wander. These methods are commonly known as Adaptive Timing.

Another known method of signaling phase over a packet fabric is to timestamp each packet. For example, the creation time of each packet can be logged and inserted into overhead bytes of the packet. This scheme has the benefit of being insensitive to PDV. However, because each packet carries data and control information (the timestamp), the egress port must segregate the two components when it re-generates the CBR client stream. In addition, the potential throughput of the fabric is reduced by the amount of bandwidth consumed by the timestamp. Another key requirement for this methodology is that the source and destination of the data must have access to the same reference clock. This common clock controls the rate at which the timestamp counter increments. This method is commonly known as Differential Timing.

In the application of transporting a CBR client through a SONET/SDH or OTN network, there are a number of known ways to control the transmit clock at the egress NE to be phase-locked to the CBR client received by the ingress NE.

One method is to construct General Framing Protocol (GFP) frames with fixed amount of CBR client data, transport the GFP frames through the network, and write the CBR client data into a FIFO and read from the FIFO at the transmit clock rate. The transmit clock is sped up or slowed down depending on whether the FIFO depth is above or below an equilibrium threshold. A highly related scheme is to use a phase discriminator to monitor packet arrivals and compare it against the transmit clock. The phase discriminator will get a phase dump equal to the amount of data in each packet as packets arrive. Both of the above schemes are subject to the effects of how GFP frames of multiple CBR clients are multiplexed onto a single SONET or OTN path. Consider the case where three CBR clients (Clients A, B and C) are multiplexed using the GFP Extension Header facility defined in ITU G.7041. If the multiplexing order had been A, B, C over an extended period of time and then switches to C, B, A the arrival times of GFP frames of Client C would suddenly be earlier than expected and arrival times of Client A would be later. The transmit clock of Clients A and C will experience a phase hit which is seen by the CBR client as wander.

Another known method of signaling phase over a telecommunications network is to timestamp each GFP frame in a manner analogous to SRTS in ATM networks (U.S. Pat. No. 5,260,978, which is incorporated by reference in its entirety). For example, the creation time of each GFP frame can be logged and inserted into overhead bytes of the frame. This scheme has the benefit of being insensitive to PDV. However, because each packet carries data and control information (the timestamp) the egress port must segregate the two components and process them separately. It would not be possible for an NE using timestamps to inter-operate with one that does not.

It is, therefore, desirable to provide methods and apparatus which allow for the better transmission of phase information relating to packetized CBR data streams.

BRIEF DESCRIPTION OF THE DRAWINGS

Embodiments of the present disclosure will now be described, by way of example only, with reference to the attached Figures, wherein.

DETAILED DESCRIPTION

Figure 1:
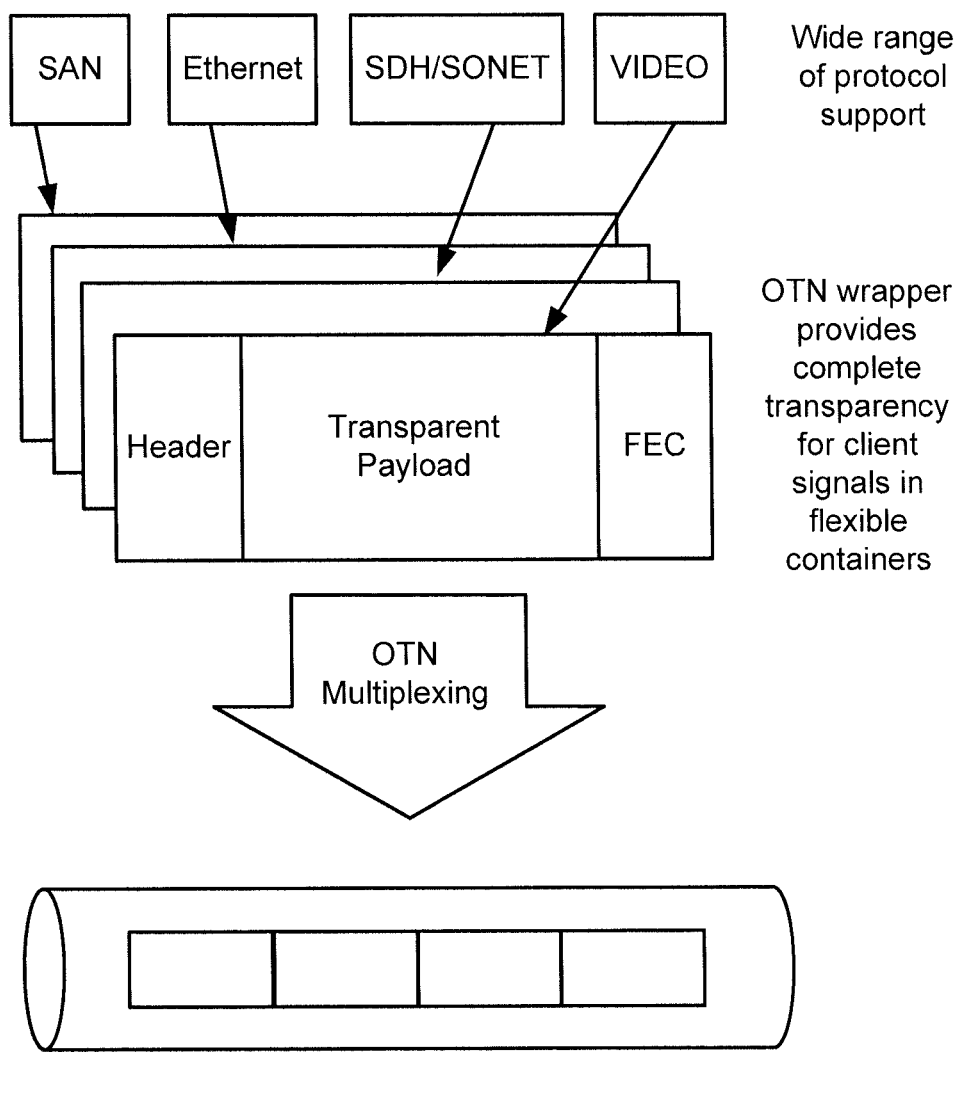
FIG. 1 illustrates an OTN mapping.

Generally, the present disclosure provides a method and apparatus for signaling the phase and frequency of CBR clients over a network or fabric. An incoming CBR client stream is segmented into variable sized segments, such as packets or GFP frames, and is regenerated on the other side of a fabric or network phase-locked to the incoming stream. Regeneration of the CBR client clock is based solely on segment sizes, and in the case of GFP frames, the rate of the SONET Path or OTN ODUk stream carrying the GFP frames. No overhead bytes are inserted into the GFP frames to convey phase and frequency information. The method disclosed is important for reducing the cost and complexity of communications networks by allowing CBR clients to be transported with low jitter and wander without requiring the source and sink network elements to be phase-locked to a common stratum reference.

A method and system are provided for transporting a segmented or packetized CBR stream in which phase information lost during the packetization process can be recovered, without adding bits to the data stream.

It is an object of the present disclosure to obviate or mitigate at least one disadvantage of previous CBR switches and networks.

The present disclosure provides a method and apparatus for transporting a CBR client signal across a packet interface, in which the process of converting the CBR client signal into packets loses the phase information of the CBR client signal, such that an egress element (that is to say an egress card, node etc., located downstream from said packet interface) can regenerate said CBR client signal without requiring phase and frequency information be inserted into said packets.

Aspects of the disclosure are applicable within a network node or across a network. For example, within a network node, an Ingress card receives a CBR and converts said CBR client signal into packets, which are routed across a packet interface (in this example, typically a packet fabric) to an Egress card, which reconstructs the CBR client signal. As an example across a network, an Ingress Node receives a CBR client and converts said CBR client signal into packets, which are routed across a packet interface (in this case a packet network, or possibly via a SONET or OTN network via some intermediate block, for example a GFP framer) to an Egress Node, which reconstructs the CBR client signal.

Aspects of the disclosure are directed to regenerating the phase and frequency of CBR client which has been packetized and transmitted over a packet switching network or fabric solely via variations in the size of variable sized packets, without requiring phase and frequency information be inserted into the header of said packets. Because the current disclosure does not employ timestamps, it inter-operates with all existing egress NEs. In order to correctly interpret timestamps, the ingress and egress NEs must have access to a common clock that increments their timestamp counters. This clock can be provided from a stratum traceable reference clock. Alternatively, the OTN line clock can be used as the common clock, with such a method being limited to OTN networks.

According to one aspect of the disclosure an incoming CBR client stream received on one side of the packet switch fabric is packetized into variable sized packets and is regenerated on the other side of the fabric phase-locked to the incoming stream. Regeneration of the CBR client clock is based solely on packet sizes. No overhead bytes are inserted into the packets to convey phase and frequency information. This has the advantage of reducing the cost and complexity of network elements by allowing CBR clients and packet clients to be switched by a common packet fabric.

In further aspect, the present disclosure provides a method and apparatus for packetizing Constant Bit Rate client streams into variable sized General Framing Protocol (GFP) frames, sending those frames over a SONET or OTN network and regenerating the CBR client, phase-locked to the incoming stream. Regeneration of the CBR client clock is based solely on the GFP frame sizes and the rate of the SONET Path or OTN ODUk stream carrying the GFP frames. No overhead bytes are inserted into the GFP frames to convey phase and frequency information. Such a method and apparatus has the advantage of reducing the cost and complexity of communications networks by allowing CBR clients to be transported with low jitter and wander without requiring the source and sink network elements to be phase-locked to a common stratum reference.

Accordingly, embodiments of the disclosure relate to the transport of CBR streams across a packet fabric within a network node. Other Embodiments relate to the transmission and reconstruction of a client CBR stream which has been packetized and mapped into a carrier CBR stream at a first node and transmitted across a network to a far end node. Embodiments of the disclosure can be implemented within the cards of such a node.

It should be appreciated that there is a common element to both embodiments within a NE or Node, and to embodiments that operate across nodes. In some cases, the embodiments relating to the cards which transmit a CBR across a fabric within a switch can be thought of as a simplification of the cards within nodes of a network, because within a switch, both the ingress port card and the egress port card have access to the same local reference clock.

In an embodiment, the present disclosure provides a method for transporting a CBR data stream comprising the following steps at an ingress element: measuring a CBR clock rate for an input CBR stream and generating segment size decisions such that said segment size decisions vary dependent on said CBR clock rate; dividing said CBR stream into variable size segments using said segment size decisions; transmitting said variable size segments to an egress element. The method also comprises the following steps at said egress element: receiving said variable size segments; determining size indications dependent on the size of each variable size segment; and reconstructing said CBR stream from said variable size segments at a rate adjusted to match said CBR clock rate based on the variation in sizes of said size indications.

The measuring step can comprise determining that said CBR clock rate is greater than, less than or equal to an approximated base CBR clock rate derived from a local reference clock and wherein said dividing step comprises sizing any given segment to be larger than, less than or equal to a base size indicative of said approximated base CBR clock rate.

Over time, the variation in segment size decisions can indicate variances between said CBR clock rate and said approximated base CBR clock rate. The approximated base CBR clock rate can be defined using integers C and $T_{ref}$, where C is a base segment size in bytes and $T_{ref}$ is a number of local reference clock cycles such that said approximated base CBR clock rate in bits per second is given by $C*8/T_{ref}$.

The measuring step can utilize a control loop configured to correctly compensate said segment size decisions for the difference between said approximated base CBR rate and said CBR clock rate, wherein said segment size decisions are determined every $T_{ref}$ clock cycles of said local reference clock, where $T_{ref}$ is an integer.

The reconstructing step can comprise outputting bits from said received segments at said CBR clock rate by outputting bits at a local egress clock rate adjusted based on said sizes of segments. The local clock rate can be adjusted by fractional-N clock synthesis configured such that said output CBR stream from said egress element matches the frequency and phase of the original CBR data stream at said ingress element. The fractional-N clock synthesis can use a phase locked loop to adjust the rate of said local egress clock rate to match said CBR clock rate based on said size sizes of segments.

The measuring step can assign the length of any given segment to be C+N bytes, C−N bytes or C bytes respectively, wherein N is an integer, such as 1. Over time, the number of occurrences of C byte, C+N byte and C−N byte segments can depend on the variance of said CBR clock rate from said approximated base CBR rate. The approximated base CBR clock rate can be configured by programming the values C and $T_{ref}$. The approximated base CBR clock rate can be automatically detected from said CBR stream and the values of C and $T_{ref}$ are automatically selected.

A packet fabric can be provided between said ingress and egress elements, said packet fabric being within a network element, and said ingress and egress elements can be ingress and egress cards respectively, with said ingress and egress cards sharing a common local reference clock.

The size of received segments can be determined and written into a segment size FIFO, and read from said segment size FIFO every $T_{ref}$ cycles of said common local reference clock and enter a control loop which adjusts said fractional-N clock synthesizer to generate an egress CBR clock rate matching said CBR clock rate.

The ingress element can be an ingress node, the egress element can be an egress node and a CBR carrier network can be provided between said ingress and egress nodes, said variable size segments being transported as client segments across said CBR carrier network via a carrier CBR signal. The transmitting step can comprise mapping said client segments into said carrier CBR signal, and at said egress node, said determining step can comprise measuring client size indications indicating a rate of said client CBR signal. The method can further comprise receiving said carrier CBR signal, and measuring carrier size indications indicating a rate of said carrier CBR signal, wherein said reconstructing step comprises outputting bits from said received client segments at said CBR clock rate by outputting bits at an egress node local reference clock rate adjusted based both on said client size indications and on said carrier size indications.

The can further comprise determining a relationship between an ingress node local reference clock and said egress node local reference clock using said carrier CBR size indications. The transmitting step can comprise mapping said client segments into said carrier CBR signal, and said step of receiving said carrier CBR signal comprises demapping said carrier CBR signal to output said client segments and placing said client segment size indications into a client size FIFO buffer. The reconstructing step can comprise: deriving an egress CBR rate using said carrier CBR size indications and said client segment size indications; reading said client segment size indications once every $T_{ref}$ cycles of said ingress node local reference clock, wherein $T_{ref}$ is a number of local reference clock cycles; and adjusting said egress node local reference clock rate based on said carrier CBR size indications and said client segment size indications.

The derivation step can comprise: reading said carrier size indication FIFO every $T_{Bref}$ cycles of said egress node local reference clock, comparing the size indications with a sequence of carrier size indications generated from a carrier CBR stream whose rate is nominal compared to said egress node local reference clock, and using a result of said comparison to generate a series of integer values of $T_{Eref}$ such that, on average, $T_{Eref}$*egress reference clock periods=$T_{ref}$*ingress reference clock periods.

In said reading step, the reading of said client segment size indication FIFO can be performed every $T_{Eref}$ cycles of said egress local reference clock, where $T_{Eref}$ is taken from said generated series of integer values $T_{Eref}$, and further comprising providing said client segment size indications as reference phase to a phase locked loop.

In another embodiment, the present disclosure provides an apparatus for transmitting a CBR data stream, comprising an ingress element and an egress element. The ingress element includes: a rate measurement block configured to measure a CBR clock rate for an input CBR stream and generate segment size decisions such that said segment size decisions vary dependent on said CBR clock rate; and a segment maker configured to divide said CBR stream into variable size segments using said segment size decisions and to transmit said variable size segments. The egress element includes: a segment monitor configured to receive said variable size segments from said segment maker and to determine size indications dependent on the size of each variable size segment; and an adaptive clock block configured to decode said packet size indications into the original data rate and to control transmitter frequency relative to said local egress element reference clock such that the transmitter frequency matches the frequency and phase of the original CBR data stream at said ingress element.

The rate measurement block can comprise: a free running CBR byte counter configured to measure the exact amount of phase coming in on an input CBR data path; a feedback byte counter configured to count and increment a segment size once every $T_{ref}$ reference clock cycles; a loop filter configured to receive a difference of outputs of said CBR byte counter and said feedback byte counter; and a quantizer configured to receive an output of said loop filter and generate a new output value as said segment size indication to said segment maker, and as an output on a feedback path.

The adaptive clock block (ACB) can comprise: a client segment size indication FIFO configured to receive client size indications indicative of variations in the size of said segments from said segment monitor; and an ACB control loop configured to produce a transmitter rate control signal to adjust a local reference clock which causes said transmitter to match said client CBR rate, such that said client CBR stream is output at said client CBR clock rate.

The ingress element can be an ingress node, the egress element can be an egress node and a CBR carrier network can be provided between said ingress and egress nodes. The variable size segments can be transported as client segments across said CBR carrier network via a carrier CBR signal, wherein said rate measurement block comprises a client rate measurement block configured to measure client size indications indicating a rate of said client CBR signal. The apparatus can further comprise: a mapper configured to map said client segments into said carrier CBR signal; a carrier rate measurement block configured to measure carrier size indications indicating a rate of said carrier CBR signal; and a carrier segment size indication FIFO configured to receive carrier segment size indications from said carrier rate measurement block. The adaptive clock block can be configured to output bits from said received client segments at said CBR clock rate by outputting bits at an egress node local reference clock rate adjusted based both on said client size indications and on said carrier size indications.

The can be further configured to map said client segments into said carrier CBR signal; and further comprise: a client size FIFO buffer; a demapper configured to demap said carrier CBR signal to output said client segments and place said client segment size indications into said client size FIFO buffer. The adaptive clock block can be configured to derive a relationship between an ingress node local reference clock and said egress node local reference clock using said carrier CBR size indications and said client segment size indications, to read said client segment size indications once every $T_{ref}$ cycles of said ingress node local reference clock, wherein $T_{ref}$ is a number of local reference clock cycles, and to adjust said egress node local reference clock rate based on said carrier CBR size indications and said client segment size indications.

In a further embodiment, the present disclosure provides a network element comprising: an ingress port arranged to measure a rate of an incoming CBR data stream relative to a local reference clock, and to convey phase information by segmenting said incoming CBR data stream into segments sized to reflect said measured rate of said incoming CBR data stream; and an egress port including a transmitter and arranged to receive said segments from said ingress port, to decode segment size indications into the original data rate, and to control said transmitter frequency relative to said local reference clock such that the transmitter frequency matches the frequency and phase of the original CBR data stream at said ingress port.

The phase information can be conveyed using relative size indications associated with the segments, said relative size indications indicating the relative phase of data in the segments. The phase information can be conveyed without inserting phase or frequency information bits into the segments.

The network element can further comprise two rate measurement blocks and wherein said egress port receives client and carrier segment size indications on the basis of which to control said transmitter frequency, said client segment size indication being a measurement of said CBR data stream relative to a reference clock at said ingress node, and said carrier segment size indication being a measurement of an incoming carrier relative to a reference clock at said egress node.

In another embodiment, the present disclosure provides a method of transporting a CBR stream, comprising, at an ingress port: measuring a rate of an incoming CBR data stream relative to a local reference clock; and conveying phase information by segmenting the incoming CBR data stream into segments sized to reflect the measured rate of the incoming CBR data stream. The method further comprises, at an egress port: receiving the segments from the ingress port and decoding segment size indications into the original data rate; and controlling a transmitter frequency relative to the local reference clock such that the transmitter frequency matches the frequency and phase of the original CBR data stream at the ingress port.

The phase information can be conveyed using relative size indications associated with the segments, said relative size indications indicating the relative phase of data in the segments. The phase information can be conveyed without inserting phase or frequency information bits into the segments.

The step of receiving can comprise receiving client and carrier segment size indications, and wherein said step of controlling comprises controlling the transmitter frequency on the basis of said client and carrier segment size indications, said client segment size indication being a measurement of the CBR data stream relative to a reference clock at the ingress node, and said carrier segment size indication being a measurement of an incoming carrier relative to a reference clock at the egress node.

The current disclosure does not burden the telecommunications network with the requirement of locking the ingress and egress NEs to the same stratum source nor is the OTN clock a requirement as the disclosure can be applied equally well to a SONET/SDH network.

Other aspects and features of the present disclosure will become apparent to those ordinarily skilled in the art upon review of the following description of specific embodiments of the disclosure in conjunction with the accompanying figures.

Figure 2:
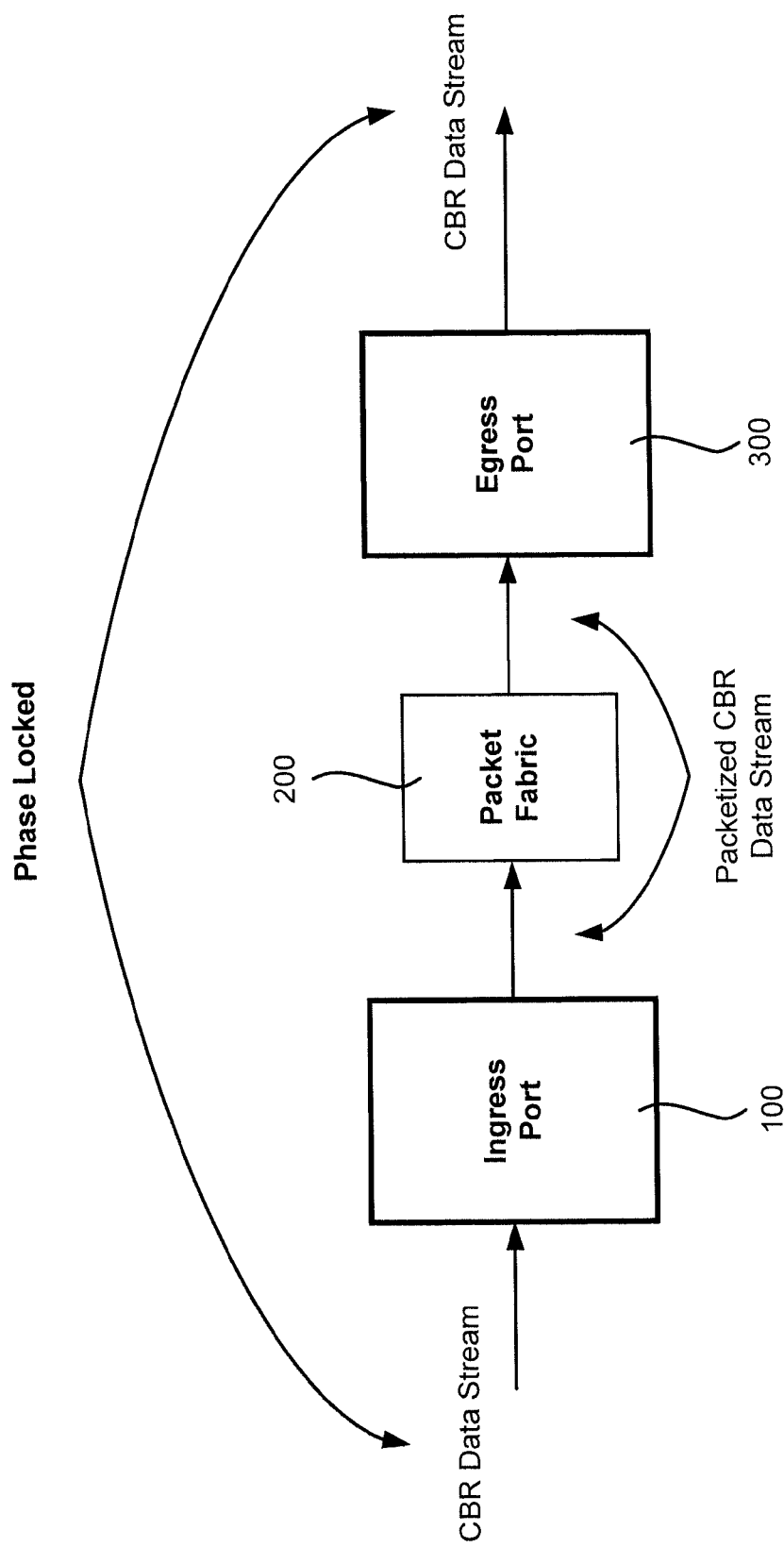
FIG. 2 illustrates a Network Element with CBR Client ports.

FIG. 2 shows a Network Element switching CBR and Packet clients. When an NE switches a CBR client data stream from an ingress port 100 to an egress port 300, it controls the transmit clock of the egress port 300 to be phase-locked to the recovered clock of the incoming client. To traverse the packet fabric 200, the CBR client stream is segmented into a series of packets. At the egress port 300, the packets are re-assembled into a continuous CBR client stream. Generally, the process of packetizing the CBR stream removes the phase information from the signal. Therefore, a method to recover the phase of the original CBR signal is required at the egress port.

Figure 3:
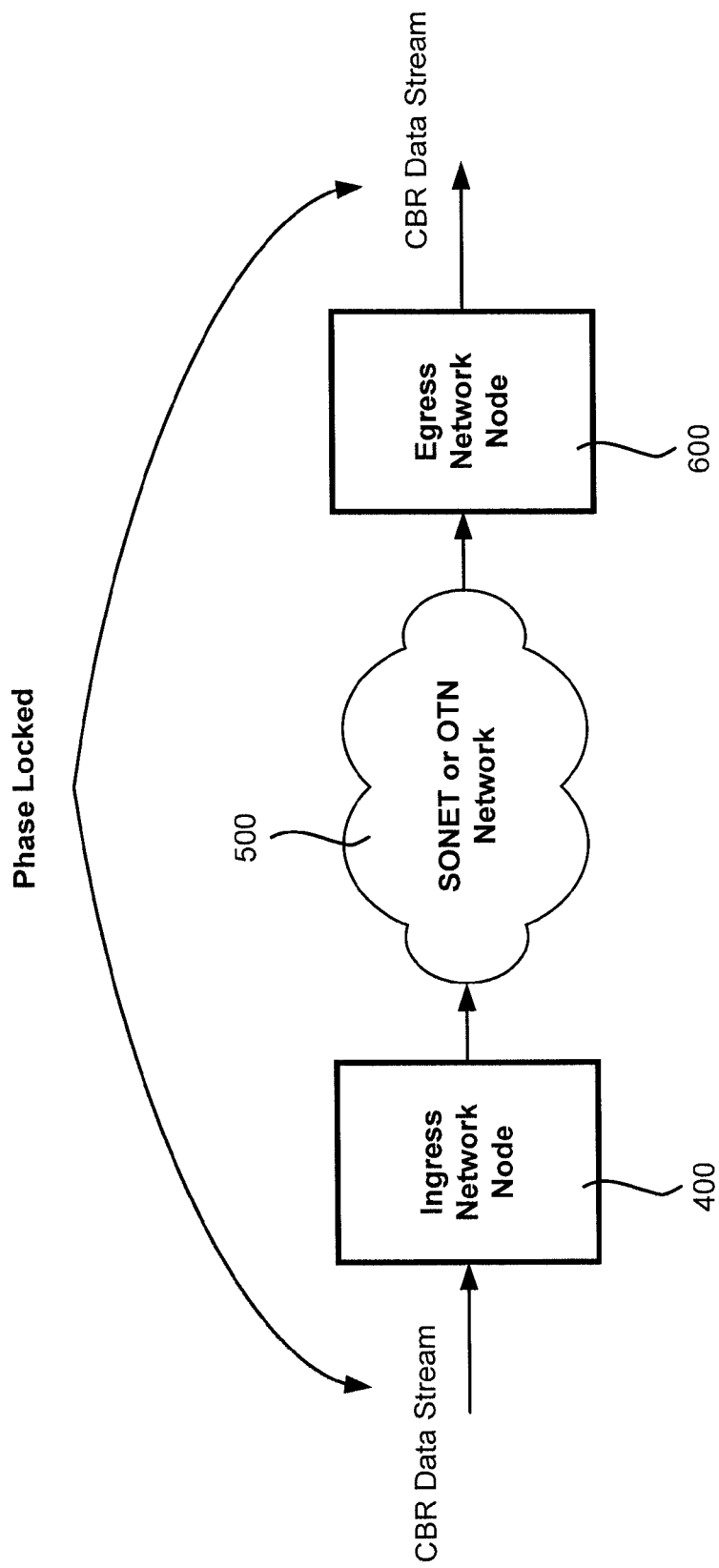
FIG. 3 illustrates a CBR client transported over a SONET/SDH or OTN network.

FIG. 3 shows a CBR client being transported over a telecommunications network. The Ingress 400 and Egress 600 NEs are inter-connected by SONET (SDH) or OTN links 500. The number of potential CBR client protocols is virtually limitless. A flexible means of accommodating a wide range of CBR client rates is to map the CBR clients into GFP frames. Arbitrary CBR clients can be mapped into GFP-F frames. 8b10b clients can be mapped into GFP-T frames. At the egress Network Node 600, the payload of the GFP frames is re-assembled into a continuous CBR client stream.

Figure 4:
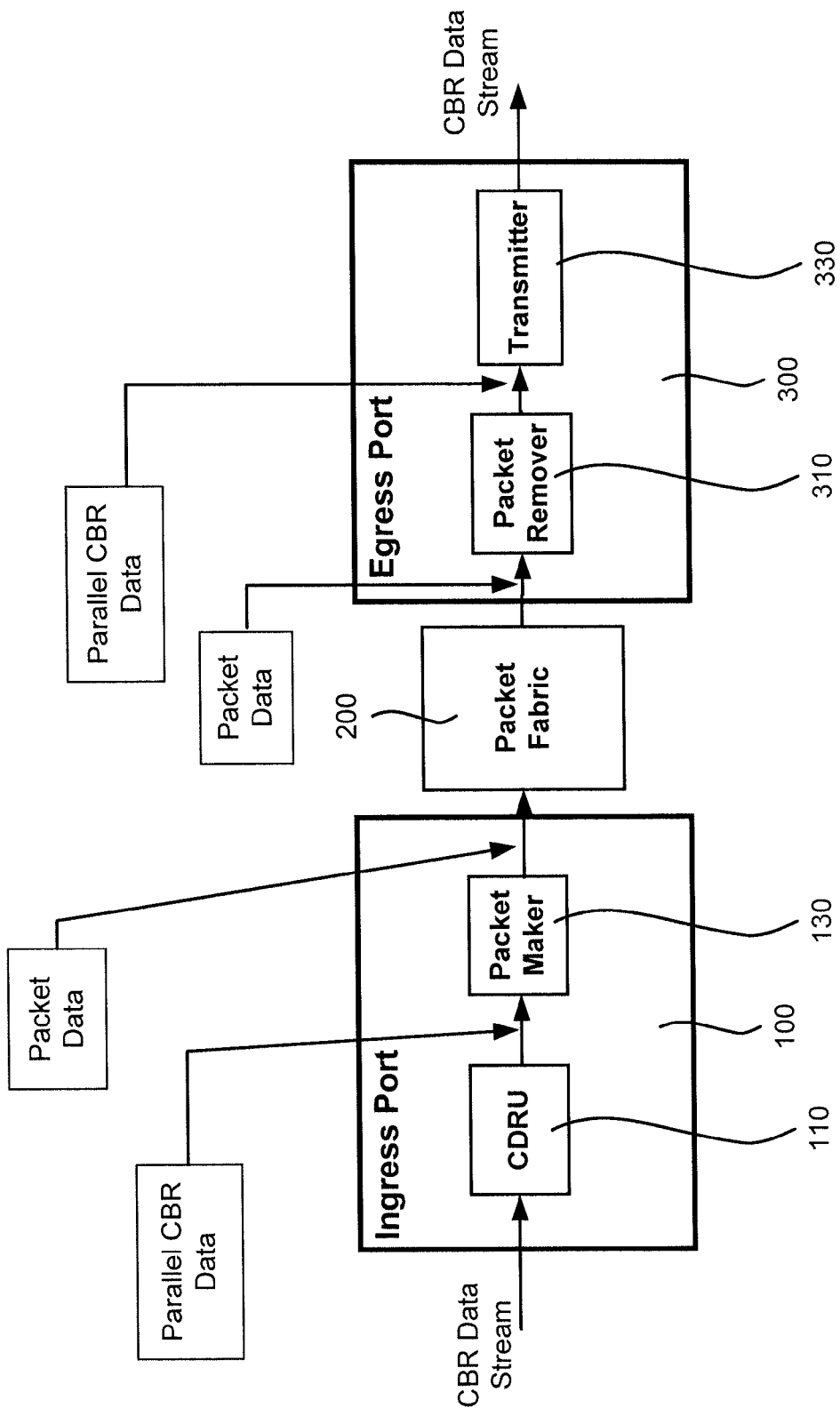
FIG. 4 illustrates a generalized network packet switching element.

FIG. 4 illustrates a known and generalized network packet switching element. At the ingress port 100, an input interface, for example a SERDES Clock and Data Recovery Unit (CDRU) 110, receives the incoming serial CBR data stream and reformats it into a parallel data bus. The CBR data is then divided into packets by the packet maker block 130 in a format that can be switched by the packet fabric 200. At the egress node 300, the packet remover 310 regenerates the parallel CBR data stream and sends it on to the SERDES transmitter 330 where it is serialized and retransmitted.

In the known approach of FIG. 4, to ensure that the incoming CBR data at the ingress port 100 is phase-locked to the CBR data at the egress port 300, phase information must either be passed through the packet fabric along with the data or recovered in the egress port. This requirement exists since phase information is generally lost during the packet generation process.

Figure 5:
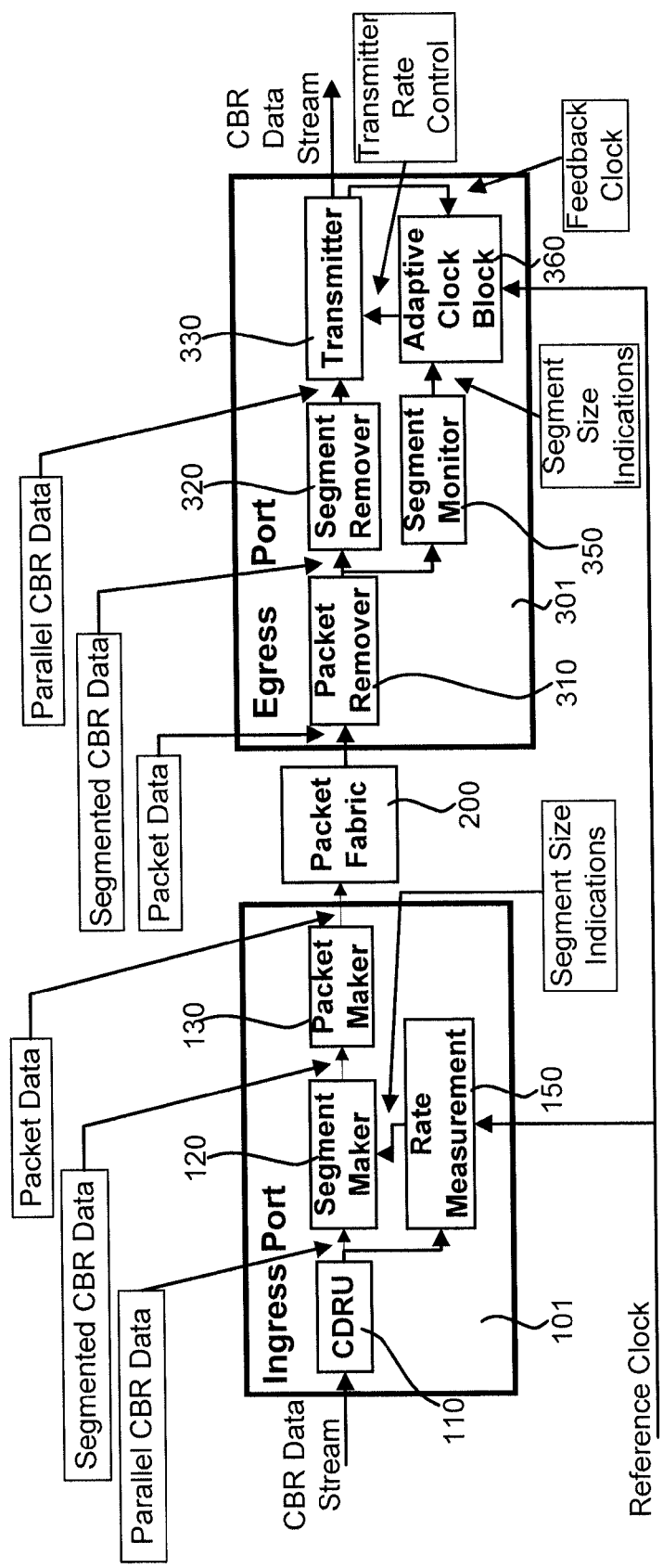
FIG. 5 illustrates an enhanced network element, according to one exemplary embodiment of the disclosure.

An enhanced network element is shown in FIG. 5, according to one exemplary embodiment of the disclosure. An additional rate measurement block 150 at the ingress node 101 measures the rate of the incoming CBR data stream relative to a local reference clock. The relative rate is converted into size indications used by the segment maker 120. Rather than making segments that are all the same size, the segment maker 120 in FIG. 5 will make segments that are either at a base size (equals C bytes), base plus one byte (C+1 bytes), or base minus one byte (C−1 bytes) as indicated by Segment Size indications received from the rate measurement block 150. The packet maker will then convert the segments into packets in a conventional manner, based on the size of the segments.

At the egress node 301, the packets are disassembled by packet remover 310 to reproduce the segments, which are then fed to segment remover 320 which regenerates the parallel CBR data stream and sends it on to the SERDES transmitter 330 where it is serialized and retransmitted. Segment monitor 350 then measures the size of the incoming segments and sends the segment size indications (C, C+1, C−1) on to the Adaptive Clock Block (ACB) 360. Finally, the ACB 360 decodes the packet size indications into the original data rate. Using the decoded rate information, the ACB makes the transmitter 330 speed up or slow down its frequency relative to the local reference clock such that it matches the frequency and phase of the original CBR data stream at the ingress node. In this way, the ingress and egress CBR data streams are phase-locked.

It should be noted that in this example the ingress port 101, the packet fabric 200 and the egress port 301 are all part of the same network element, and as such, share the same local reference clock, as shown.

In FIG. 5 the packets are assembled from the appropriately sized segments based on whatever protocol/bus is necessary to traverse the particular fabric used. While the size of the packet may differ from the size of the segment due to overhead added for the purpose of traversing the fabric, the relative size of the packet to the segment should not change as no additional overhead is needed for the purposes of conveying the size. In other words, the variation in size between the stream of packets should be the same as the variation in size of the segments which are sized as discussed herein. For example, if a segment is C+1 bytes long, the packet would be $C_p$+1 bytes long, where $C_p$ is C+any packet overhead bits, and similarly if the segment is C−1 bytes long, then the packet should be $C_p$−1 bytes long. Accordingly, for ease of discussion, we will refer to segment size and packet size interchangeably, as one is a function of the other.

It should also be noted that the segment and packet makers need not be separate. For ease of understanding, we have illustrated the segment maker 120 as a block separate from the packet maker 130, for the purpose of indicating that the packet making function of wrapping the bits of the segmented data need not change in order to produce packets configured to traverse the packet fabric 200, and in particular to indicate that it is not necessary to insert phase information into the overhead of each packet. Accordingly throughout this specification, the term measuring the size of the incoming packets should be construed to measure either the size of the packets or the size of the segments. What is important is the system determines a size indication dependent on the size of each incoming packet, which can be determined either directly from the packet, or from the segment once the packet overhead is removed.

As the implementation in FIG. 5 illustrates, the phase of the original CBR data stream is passed through the fabric with the data using variable sized packets where the size of the packets indicates the relative phase of the data. Using this method, no bandwidth is lost to the insertion of overhead bytes to carry timestamp information or other timing words. Nor are we subject to the poor performance found using FIFO adaptation methods due to packet delay variation through the packet fabric.

The embodiments described above use packet size variation of plus and minus one byte. However, the disclosure is not limited to these packet sizes. In some applications, it may be convenient to use packet size variation of N bytes and the disclosure is easily extensible to this situation. In this case, the rate measurement block would indicate to the packet maker to generate packets size either C bytes, C+N bytes, or C−N bytes and the ACB would be aware of the size of the variation in order to properly adjust the transmitter.

Figure 6:
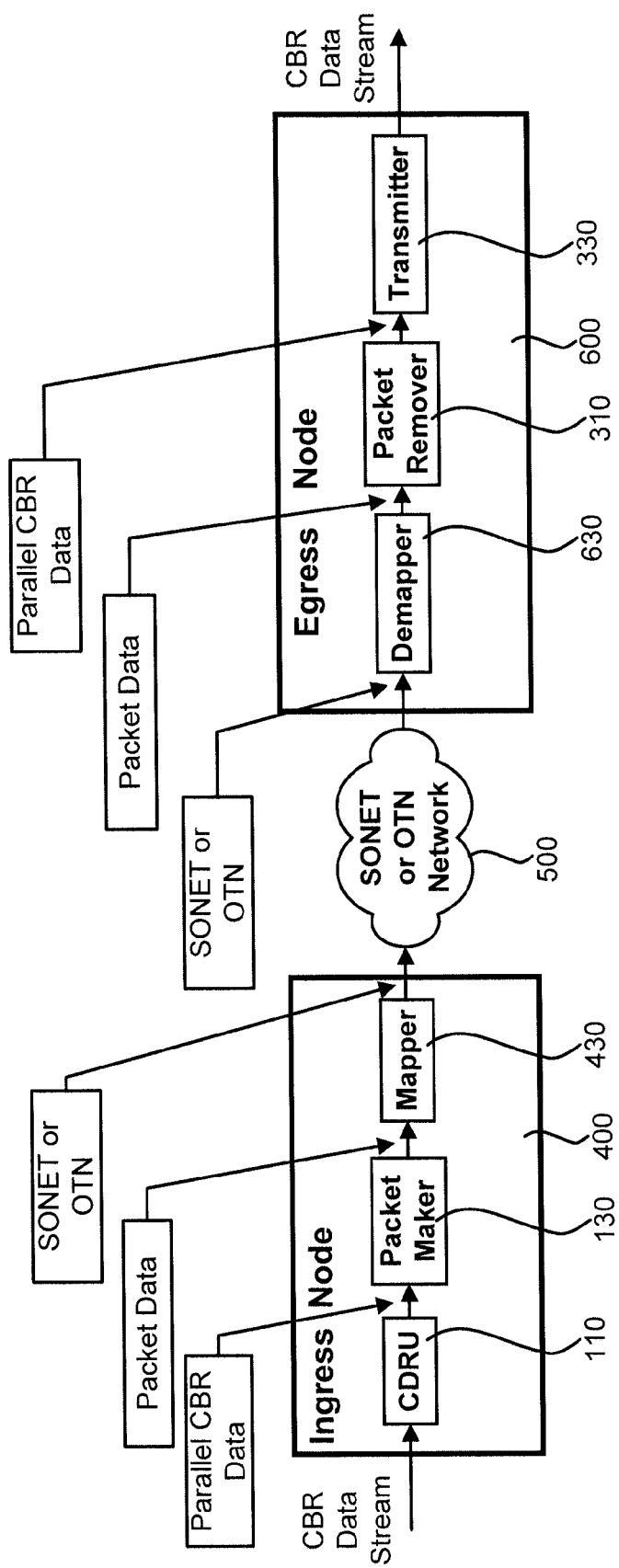
FIG. 6 illustrates a generic implementation for transporting CBR data through a WAN network via SONET/SDH or OTN.

A known generic implementation for transporting CBR data through a WAN network via SONET/SDH or OTN is shown in FIG. 6. At the ingress node 400, a SERDES CDRU 110 receives the incoming serial CBR data stream and forms a parallel data bus. The CBR data then enters a packet maker block 130 which segments the CBR data into fixed sized packets for the mapper block 430. The mapper block 430, using GFP or any other framing protocol, then takes the incoming packet data, frames it, and inserts the framed data into a higher level carrier protocol such as SONET or OTN. Finally, the ingress node transmits the SONET or OTN into the WAN 500.

At the egress node 600, the opposite function is performed. The incoming SONET or OTN enters the demapper block 630 where the GFP frames are taken out of the carrier protocol. The GFP frames are decoded to remove the packet data from the GFP framing which is sent on to the packet remover 310. The packet remover 310 converts the packet data to a parallel CBR data stream which can then be serialized and transmitted by the local SERDES transmitter 330. At the output, we have the original CBR stream received by the mapping node.

In the known approach of FIG. 6, to ensure that the incoming CBR data at the ingress node is phase-locked to the CBR data output by the egress node, phase information is passed along with the data through the SONET or OTN WAN or recovered in the egress node. This requirement exists since the phase information of the original CBR stream is lost during the packet generation process.

Figure 7:
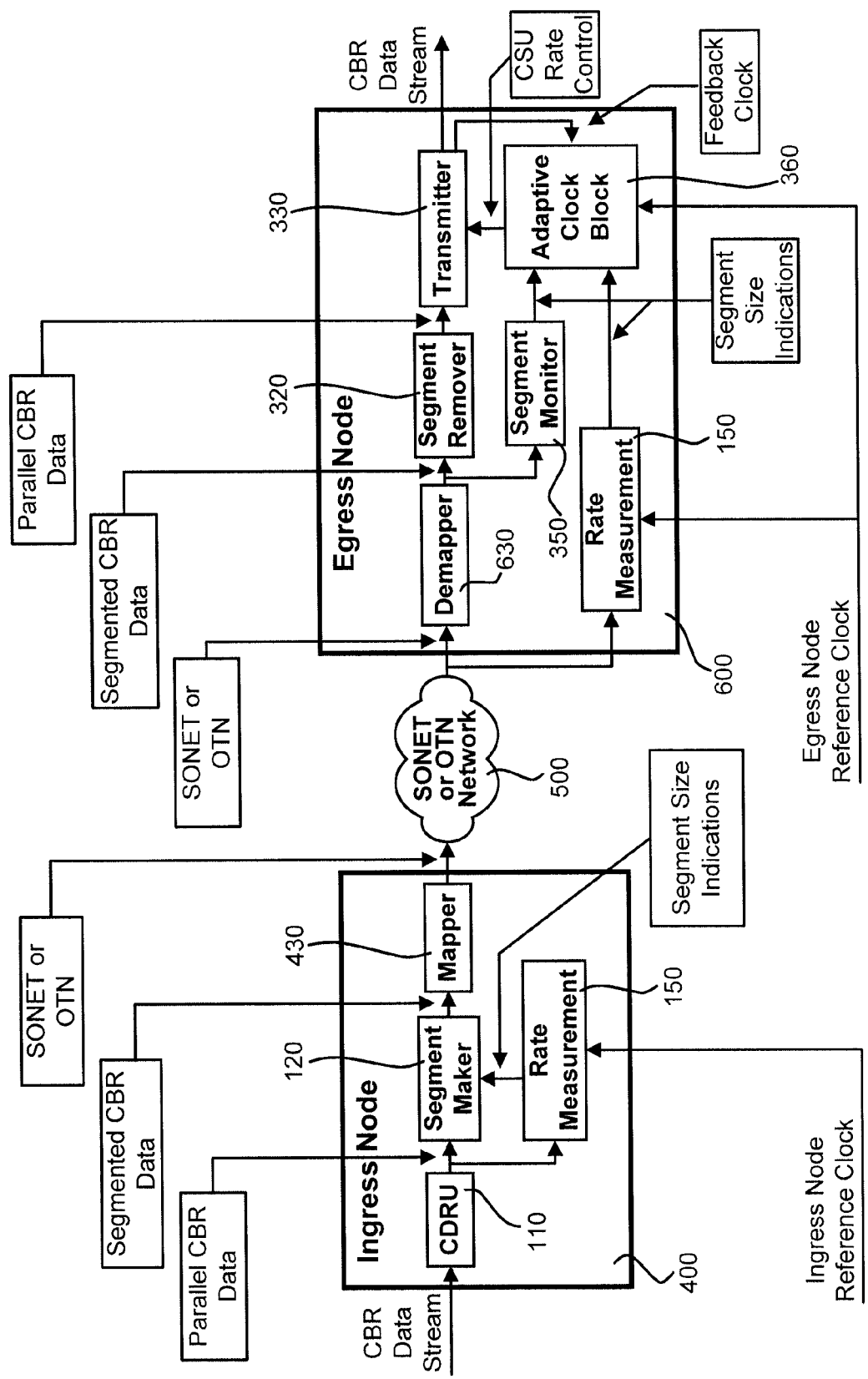
FIG. 7 illustrates an enhanced implementation for transporting CBR data through a WAN network via SONET/SDH or OTN, according to an exemplary embodiment of the disclosure.

An enhanced system is shown in FIG. 7, according to an exemplary embodiment of the disclosure. At the ingress node 400, a rate measurement block 150 is added to the system. This block measures the rate of the incoming CBR data relative to the local reference clock and converts this information into packet size indications used by the segment maker block 120. Rather than making segments that are all the same size, the segment maker will make segments that are either base size (C bytes), base plus one byte (C+1), or base minus one byte (C−1) as indicated by the rate measurement block. At the mapper block 430, the packet sizes are maintained in the framed data (via GFP or other framing protocol) when it is inserted into the higher level SONET or OTN carrier. Since the ingress node 400 is generating the carrier, its frequency is locked to the ingress node's local reference clock. However, it should be noted that GFP is just an example and other embodiments also handle both synchronous and asynchronous mapping of clients directly into the OTN.

At the egress node 600, two pieces of clock or rate information are used to regenerate the original (i.e., client) CBR data stream, namely the relative rate of the SONET or OTN carrier to the egress node reference clock, and second, the relative rate of the CBR data stream to the SONET or OTN. With these two relative rates, the relative rate of the CBR stream to the egress node reference clock can be derived. In the exemplary embodiment shown in FIG. 7, as the OTN carrier enters the egress node 600, via a carrier interface block (not shown), which sends the signal to both a demapper 630 and a rate measurement block 150. The rate of the carrier CBR is measured using a rate measurement block 150. This block in the egress node is functionally equivalent to the one in the ingress node and gives us the relative frequency of the carrier SONET or OTN to the egress node reference clock. Because SONET is a synchronous network, one measures the rate of the SONET Path layer (SDH High-Order Path layer) and not the rate of the STS-N (STM-M) frames. The output of this rate measurement block 150 is segment (or alternatively packet) size indications that are sent directly to the Adaptive Clock Block (ACB) 360. The carrier data also goes through the demapper block 630 which takes the framed data out of the carrier and de-maps the framed data into a segmented data stream. Since the GFP framing retained the segment sizes from the mapping node, the segment stream will again consist of segments that are sized C, C+1, or C−1 bytes. The segment monitor 350 detects these packet sizes and sends this data to the ACB 360 as well. Therefore, the ACB 360 has the two pieces of information it uses to regenerate the original CBR data stream with its exact original phase.

The rest of the data path comprises the packet data going through the segment remover to regenerate the parallel CBR data. This parallel data is then serialized and transmitted by the SERDES transmitter block 330.

As the implementation illustrates, the phase of the original CBR data stream is passed along with the data using variable sized packets where the variation in the size of the packets indicates the relative phase of the data. Using this method, no bandwidth is lost to the insertion of overhead to carry timestamp information or other timing words. Nor are we subject to the poor performance found using FIFO fill adaptation methods.

This embodiment of the disclosure was discussed with respect to a segment remover 320 and a segment monitor 350. This assumed that the demapper 630 removes any packet overhead which may have been inserted, to produce segmented CBR data as its output. However, as discussed above these could have been labeled as packet remover and packet monitor respectively, as the size of, and the data within the packets are directly dependent on the segments, and the difference between the two are not crucial to understanding the operation of the different embodiments of the disclosure discusses herein. It should be recognized that if the demapper 630 produces packets, then the packet remover and a packet monitor would remove any packet overhead which may have been inserted (or alternatively in the case of a packet monitor, just ignore it, as it is the variation in the sizes which is important for producing the size indications).

Further, this embodiment of the disclosure was discussed using the example of packet size variation of plus and minus one byte. However, the disclosure is not limited to these packet sizes. In some applications it may be convenient to use packet size variation of N bytes and the disclosure is easily extensible to this situation. In this case, the rate measurement block would indicate to the packet maker to generate packets size either C bytes, C+N bytes or C−N bytes and the ACB would be aware of the size of the variation in order to properly adjust the transmitter.

As discussed, the above embodiments can employ a number of functional blocks including a rate measurement block, a packet maker block, a packet monitor block, and an Adaptive Clock Block (ACB). More details about how these blocks work and their interaction, according to non-limiting and exemplary embodiments, will be described below.

The rate measurement block measures the relative rate of an incoming CBR data stream to a local reference clock. According to an embodiment of this disclosure, the nominal rate of the CBR data is programmed via two parameters. The first parameter is a measurement period in units of reference clock cycles (PKT_PERIOD). The second parameter is the number of CBR data bytes during the measurement period (PKT_SIZE). When calculating the PKT_SIZE parameter, the result can be a fractional value. In this case, it is simply rounded to the nearest integer for easier representation. Equation 1 illustrates how the PKT_SIZE is derived from the PKT_PERIOD.

$$\text{PKT\_SIZE} = \text{ROUND}\left(\frac{T_{ref} * \text{PKT\_PERIOD}}{T_{CBR}}\right) \quad \text{Equation 1}$$

$T_{ref}$ = refrence clock period $T_{CBR}$ = CBR data byte clock period

In Equation 1 a rounding function is used to convert the fractional value to an integer value. This conversion function is used to get the best performance out of the control loop. However, the disclosure is not reliant on using a rounding function and can use a truncation or a ceiling function instead.

Given these parameters, the rate measurement block looks for PKT_SIZE bytes of CBR data every PKT_PERIOD reference clocks. As noted above, in the general case, there is some error in this calculation as the reference clock period and the CBR data byte clock period are not integer multiples of each other. This nominal error ($\epsilon_{nom}$) can be found in Equation 2.

$$\varepsilon_{nom} = \left(\frac{T_{ref} * \text{PKT\_PERIOD}}{T_{CBR}}\right) - \text{PKT\_SIZE} \quad \text{Equation 2}$$

$T_{ref}$ = refrence clock period $T_{CBR}$ = CBR data byte clock period

Rearranging, we find $$\text{PKT\_SIZE} + \varepsilon_{nom} = \left(\frac{T_{ref} * \text{PKT\_PERIOD}}{T_{CBR}}\right) \quad \text{Equation 3}$$

$T_{ref}$ = refrence clock period $T_{CBR}$ = CBR data byte clock period $\epsilon_{nom}$ is simply the fractional remainder that gets lost in the rounding process and in the general case is not a rational fraction. Since it is not possible to easily represent irrational fractions, but the desire is for our method to handle virtually any CBR data rate, an embodiment of the disclosure uses a feedback control loop to generate the packet size indications. Being a closed loop, any error introduced by rounding the PKT_SIZE is corrected for by the control loop. This gives the flexibility to handle any CBR rate.

Figure 8:
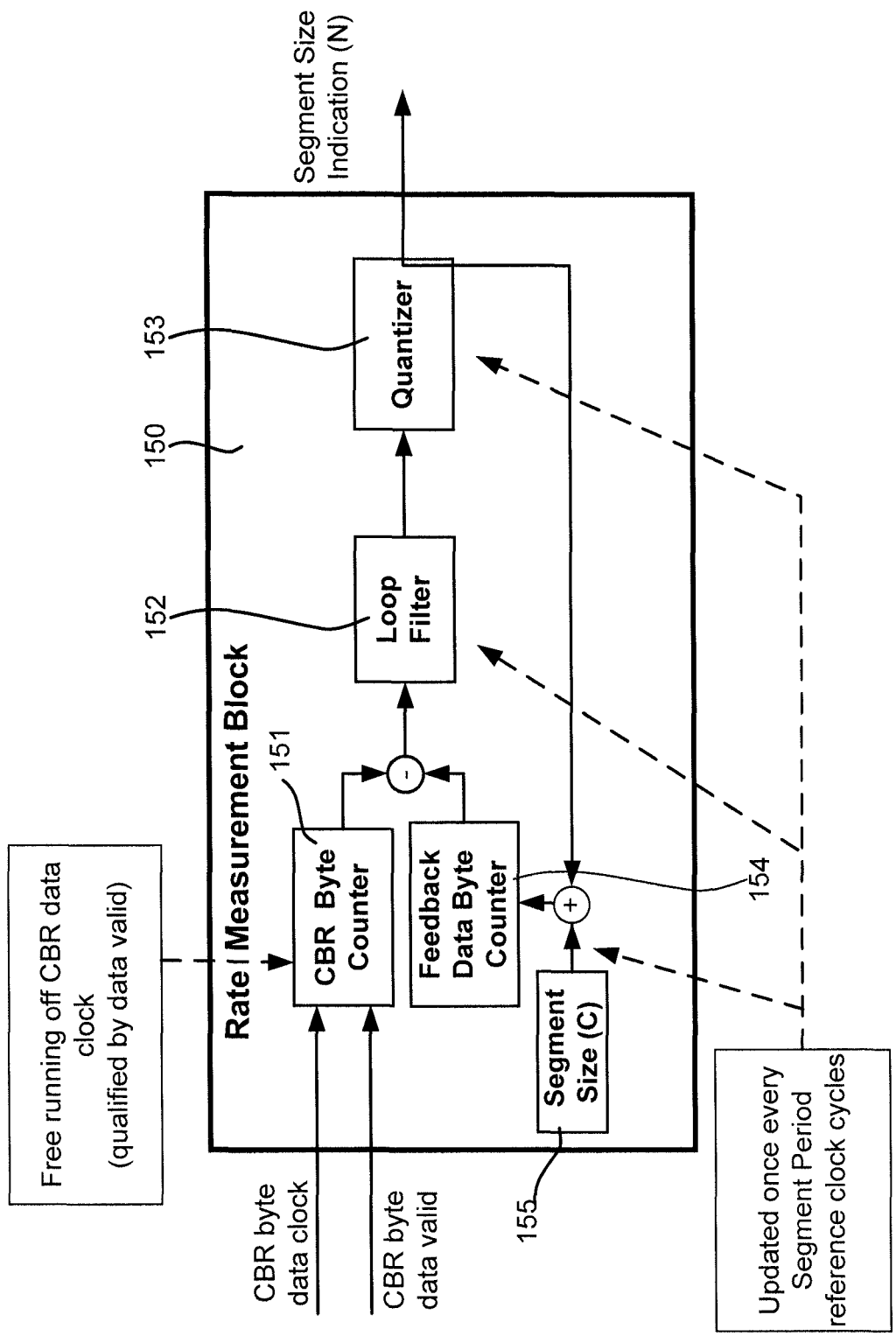
FIG. 8 illustrates an exemplary rate measurement block according to an exemplary embodiment of the disclosure.

An exemplary rate measurement block 150 according to an embodiment of the disclosure is shown in FIG. 8, in which the control loop is looking for PKT_SIZE bytes of CBR data every PKT_PERIOD reference clock cycles. As illustrated in FIG. 8, a free running CBR byte counter 151 runs off the CBR byte data clock and is qualified by a CBR data valid signal. The qualification with data valid allows the input data stream to be "gapped" where some CBR data cycles do not contain data. This CBR byte counter 151 measures the exact amount of phase coming in on the input CBR data path.

Figure 9:
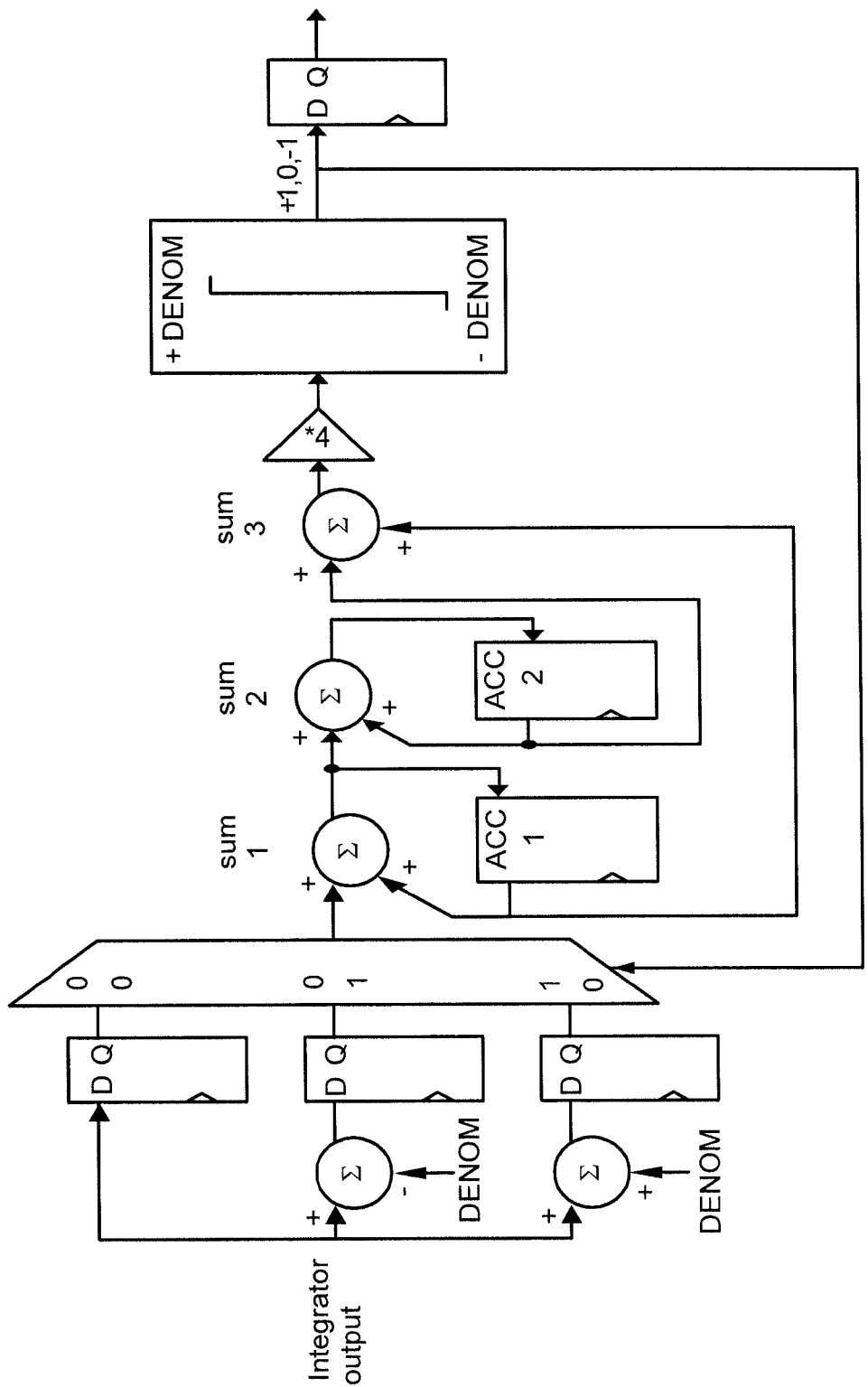
FIG. 9 illustrates a non-limiting exemplary example of a DSM circuit according to an embodiment of the disclosure.

Also, a feedback byte counter 154 is incremented by PKT_SIZE (Segment Size (c) 155) plus the output segment size or packet size indication in bytes. The feedback counter update occurs once every PKT_PERIOD reference clock cycles. As well, the two data byte counters are compared to each other every PKT_PERIOD cycles and the difference is fed into a loop filter 152. Finally, the output of the loop filter is fed into a quantizer 153 and a new output value is generated, again, this occurs once per PKT_PERIOD reference clocks. The output of the quantizer, besides being sent back on the feedback path, is output as the packet (or segment) size indication to the packet maker block as shown in FIG. 5. This structure is effectively a Delta-Sigma Modulator (DSM). A non-limiting exemplary example of a DSM circuit is illustrated in FIG. 9, according to an embodiment of the disclosure. The DSM circuit of FIG. 9 is an exemplary circuit implementation of the block diagram of FIG. 8.

Since the feedback data byte counter is incremented by PKT_SIZE bytes plus the output of the DSM every PKT_PERIOD reference clock cycles, from Equation 3 we can predict that for a nominal CBR signal the time average value of the DSM output will be $\epsilon_{nom}$. This relationship can be seen in Equation 4

$$\lim_{N \to \infty}\left(\frac{\sum_{i=0}^{N} \text{dsm\_out}}{N}\right) = \varepsilon_{nom} \quad \text{Equation 4}$$

The feedback control loop is used in this embodiment because $\epsilon_{nom}$ is generally not a rational fraction and we can not represent the value necessarily using integers. However, because the received data counter is free running, phase will never be lost and over time our control loop will compensate for the input parameter error. Once the loop has stabilized, the output will average to exactly $\epsilon_{nom}$ even though $\epsilon_{nom}$ is an irrational number.

The output is exactly $\epsilon_{nom}$ only when the received CBR data stream is nominal relative to the local reference clock. (i.e., at the expected CBR rate—for example, according to the precise rate set by a standard relative to the local reference). If the CBR data rate is not nominal (some non-zero PPM offset from nominal), the output will be $\epsilon_{act}$ as shown in Equation 5 which is analogous to Equation 3 using the actual received CBR data rate.

$$\text{PKT\_SIZE} + \varepsilon_{act} = \left(\frac{T_{ref} * \text{PKT\_PERIOD}}{T_{CBR-act}}\right) \quad \text{Equation 5}$$

$T_{ref}$ = reference clock period $T_{CBR-act}$ = Actual CBR data byte clock period We note that the difference between $\epsilon_{nom}$ and $\epsilon_{act}$ is a direct measurement of the difference of the client from its nominal or expected rate (relative to the local reference clock).

According to an embodiment of the disclosure, the profile of the DSM output values are used to ensure that downstream blocks can efficiently find $\epsilon_{act}$. The DSM is used to spread the noise of the signal to higher frequencies thereby making it easier for the downstream block to filter the signal and establish the average value ($\epsilon_{act}$).

Figure 10:
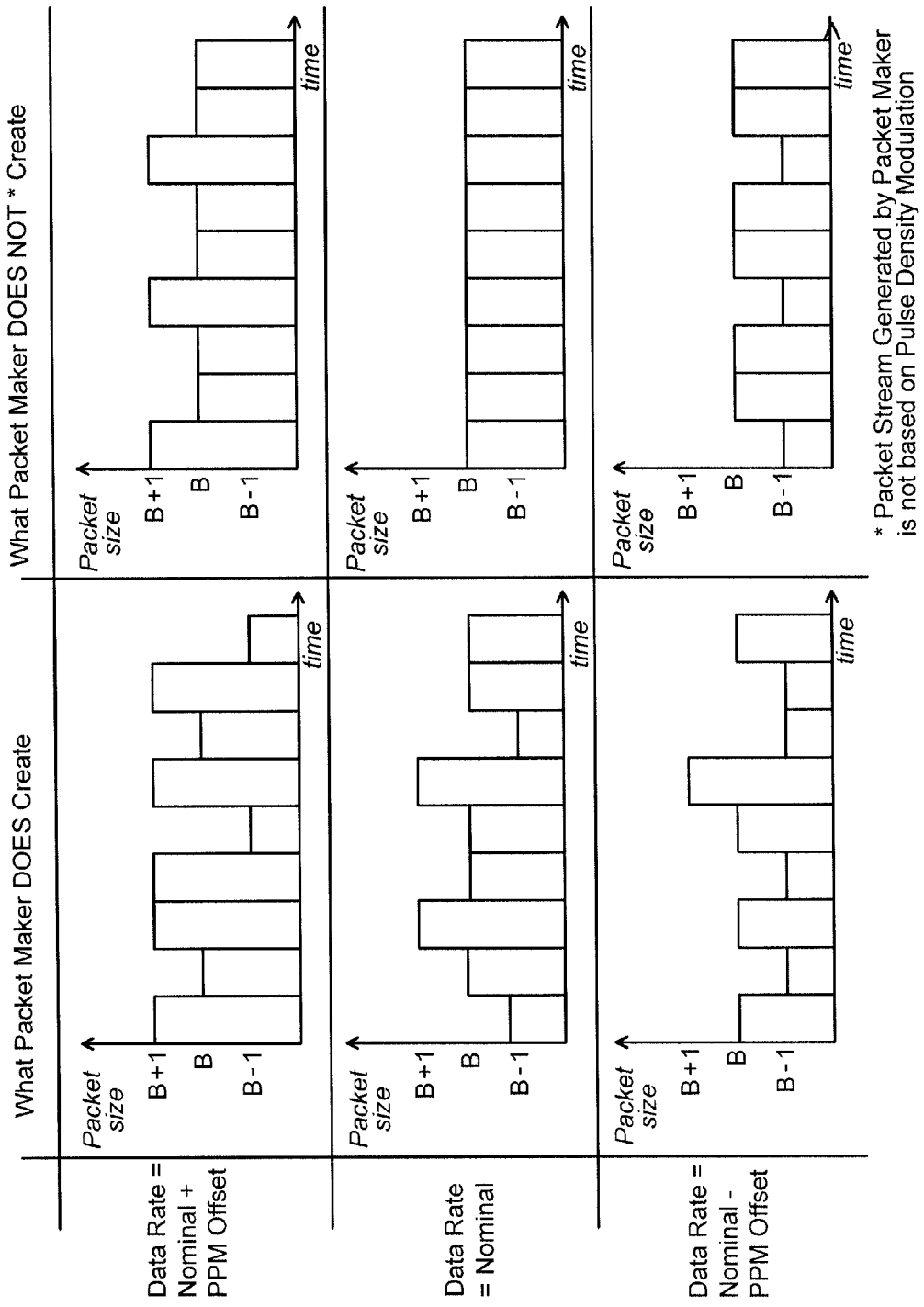
FIG. 10 illustrates some simplified examples of the patterns generated by the DSM and illustrates the noise shaping characteristics of the DSM, according to an embodiment of the disclosure.

FIG. 10 illustrates some simplified examples of the patterns generated by the DSM and also illustrates some examples of patterns not generated in this embodiment so as to illustrate the noise shaping characteristics of the DSM, according to an embodiment of the disclosure. Since the DSM shapes the noise to a relatively high frequency range, the time-average output value ($\epsilon_{act}$) can be easily obtained via a simple low pass filter.

The output of the DSM and thereby the control loop is essentially a stream of +1, 0, −1 (or +N, 0, −N) indications which encodes the rate of the incoming CBR data stream relative to the local reference clock.

Although it is not a requirement, an embodiment of the disclosure uses a modified $3^{rd}$ order Delta Sigma Modulator (DSM) as the rate measurement control loop. This type of DSM is used in the rate measurement block for a number of reasons. The noise shaping ability of the $3^{rd}$ order DSM is greater than that of a lower order DSM and will push the DSM's output signal noise to higher frequencies so that it can easily be filtered by downstream blocks. As well, the DSM is easily constructed to have three output states which is convenient for this exemplary embodiment of the disclosure.

Other DSM types and orders can be used effectively by embodiments of the present disclosure. These include, but are not limited to alternate order DSMs (both higher and lower than our $3^{rd}$ order structure), MASH DSMs, Error Feedback Loops, and other similar structures. Other DSM implementations can also include a dither generator at the input of the DSM to further reduce any tones generated by the particular DSM implementation and are covered by the present disclosure.

As noted above, the DSM output is +1, 0, −1. However, the disclosure is not limited to this data set. For example, another embodiment takes the +1, 0, −1 and multiply by N bytes. In this case, the feedback value would be +N, 0, or −N and the packet maker would generate packets of size PKT_SIZE+N, PKT_SIZE, or PKT_SIZE−N. The disclosure covers the general case where the DSM output is multiplied by N, in the above described embodiment we simply set N=1 for convenience. However, other embodiments can use any set of output integers between X and Y, where X<0<Y. In this generalized case, any number of integers can be used, the minimum being two. A simple example being −1 and +1. Note that the selected set of integers is not even required to be continuous.

In another implementation, an embodiment of the disclosure is comparing against a slightly-high or a slightly-low PKT_SIZE. In this case, the output packet size indications can use a generic set of values [0<X] or [−Y<0], respectively.

An embodiment of the control loop in the rate measurement block can theoretically be described using a continuous-time linear approximation for each of the components in the loop. This approximation is valid because the time constants involved are generally small relative to the sample clock. The integrator is modeled using Equation 6

$$F(s) = \frac{1}{s} \qquad \text{Equation 6}$$

The Quantizer in the loop provides a fixed gain as shown in Equation 7. Since the gain of this element is easily configured by changing the size of the Quantizer accumulators, the Quantizer gain is used to configure the overall loop bandwidth of the control loop.

$$K_{Quantizer}(s) = \frac{1}{Q} \qquad \text{Equation 7}$$

Where:

Q = gain of Quantizer

Figure 11:
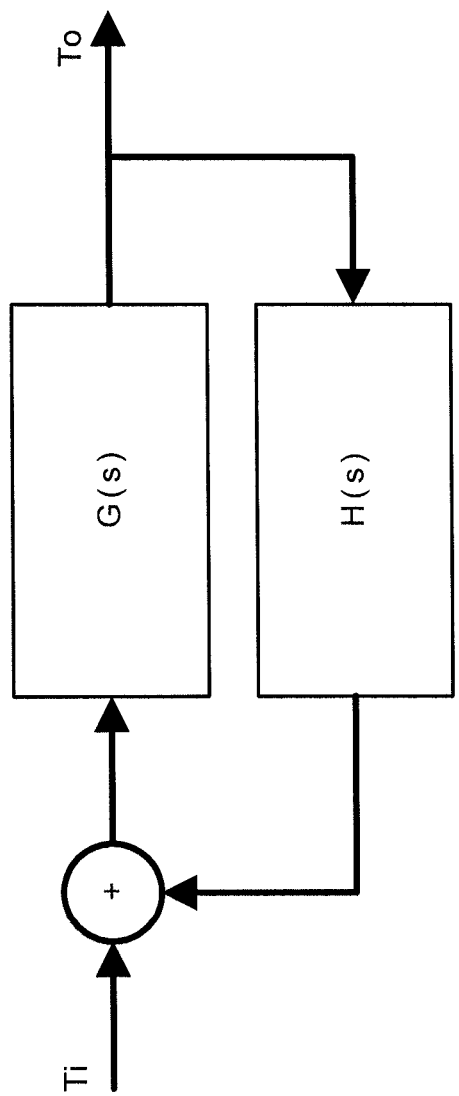
FIG. 11 illustrates a generic representation of the loop.

The individual components are assembled into a negative feedback control loop as shown in FIG. 8, according to an embodiment of the disclosure. A generic representation of the loop is shown in FIG. 11.

For this generic system, the closed loop transfer function is given in Equation 8 where G(s) is the forward gain of the system and H(s) is the feedback gain.

$$T(s) = \frac{G(s)}{1 + G(s)H(s)} \qquad \text{Equation 8}$$

In the rate measurement block control loop, the feedback has unity gain, therefore H(s)=1. The forward gain is comprised of the loop integrator and the Quantizer block, G(s)=F(s)*$K_{quantizer}$(s). Substituting these values into Equation 8, the transfer function of the system is derived in Equation 9. Equation 9 shows that the control loop has a first order response with the time constant $\tau = QT_s$. Because the control loop is actually a sampled digital system, $T_s$ is added into the equation as our sampling period (PKT_PERIOD reference clocks).

$$T(s) = \frac{G(s)}{1 + G(s)H(s)} = \frac{F(s)K_{quantizer}/T_s}{1 + F(s)K_{quantizer}/T_s} = \qquad \text{Equation 9}$$

$$\frac{\frac{1}{QT_s s}}{1 + \frac{1}{QT_s s}}$$

Simplifying gives $$T(s) = \frac{1}{1 + QT_s s}$$

According to an embodiment, the main components of the system, the feedback counter, Integrator and Quantizer are updated every PKT_PERIOD reference clocks, therefore $T_s$ is a function of the reference clock period is shown in Equation 10.

$$Ts = PKT\_PERIOD * Tref \qquad \text{Equation 10}$$

Where

Tref=Local reference clock period

From basic control loop theory, Equation 11 shows the response of a first order system, where $\omega_{3db}$ is the cutoff frequency in radians per second and $f_{3\,db}$ us the loop cutoff frequency in hertz.

$$T(s) = \frac{1}{1 + \tau s} \qquad \text{Equation 11}$$

$$\omega_{3db} = \frac{1}{\tau}$$

$$f_{3db} = \frac{\omega_{3db}}{2\pi} = \frac{1}{2\pi\tau} = \frac{1}{2\pi QTs}$$

According to an embodiment of the disclosure, both Q and $T_s$ are programmable such that the characteristics of the loop can be adjusted to meet the requirements of any application.

A person skilled in the art should note that many embodiments of the packet maker block are sufficient to support our method of transmitting phase information. It is only important that the packet maker block be capable of generating configurable sized packets and that the packet size can be varied from the base value as required by an input to the block. This input will be driven by the output of the rate measurement block described in the previous section. According to an embodiment of the disclosure, the packet maker block is also able to handle "gapped" CBR data. In this case, there may be times when data is available when a size indication is not. Conversely, there may be times when a size indication is available but data is not (during a data gap). This situation can occur since the packet size indications are being made exactly every PKT_PERIOD reference clocks, whereas the data may be entering the packet maker in a "gapped" fashion with an unknown relationship to the reference clock. To handle these cases, a small FIFO is implemented to store indications until they are required by the packet making logic. When configured properly, the fill level of the FIFO will not vary over time by more than 1 indication since the rate of packet indication generation is exactly the same as the rate of packet generation. This relationship is guaranteed by the closed loop control system in the rate measurement block.

As discussed, the goal is the efficient signaling of phase without using packet overhead bytes to carry phase information. However, it is acceptable for the packet maker block to insert header bytes or words to carry other pertinent information for a specific application unrelated to the transmission of phase information. The absolute size of the packets including overhead is not important, only that the packets carry the prescribed amount of CBR data as indicated, and that the size of the packets can be varied by a size indication, for example by a base packet size and the +1, 0, -1 indication from the rate measurement block.

Similarly, a person skilled in the art should note that many embodiments of the segment or packet monitor block are sufficient to support our method of transmitting phase information. It is only important that the packet monitor block be able to measure the size of incoming packets and report their relative size to a pre-configured nominal value of CBR data bytes. The output of the packet monitor can indicate whether the received packet contains a number of CBR data bytes greater than, equal to, or lesser than the nominal number of bytes. This output will be sent to the adaptive clock block as described in more detail in the following section.

In an embodiment, the packet maker block and the packet monitor block are somewhat aware of the packet contents. For example, if the packet maker block inserts any type of header bytes, the packet monitor detects these bytes and does not count them as part of the CBR data as reported to the ACB.

The final component in the system is the Adaptive Clock Block (ACB). The ACB decodes the packet size indications and determines the relative frequency of the CBR data stream to the local reference clock. The ACB accomplishes this by tuning the transmitter frequency to match the frequency of the original CBR data stream using another feedback control loop.

According to an embodiment of the disclosure, the ACB can be used in either the egress node of a switch (for example as illustrated in FIG. 5), or within a far end (or egress) node which receives a client CBR which is packetized and mapped into a carrier CBR. In other words, it can be advantageous from a design and manufacturing perspective to produce a single card which can be inserted in a node and which can be configured to operate in either mode. If the same ACB is reused, then the ACB has two main modes of operation. The first mode handles the application described above with respect to a Packet Switching Element, for example, as illustrated in FIG. 5. In this case there is one rate measurement block in the system and the ACB receives only one stream of packet size indications. These packet size indications are a measurement of the CBR data stream relative to the local reference clock which is common to both the rate measurement block (at the ingress port) and the ACB (at the egress port). This mode of operation is labeled "C mode" since the packet size indications are for the client CBR data only.

In the second application, described above with respect to Transmitting CBR Data over the WAN, there are two CBRs (the original client CBR and the carrier CBR into which the client CBR is packetized and then mapped). There are accordingly two CBR clock rates that are accommodated, namely the client and carrier CBR clock rates. Accordingly such a system includes two rate measurement blocks and the ACB receives two streams of packet size indications. The first stream of packet size indications are a measurement of the CBR data stream relative to the reference clock at the ingress node. The second stream of packet size indications are a measurement of the incoming carrier (e.g., OTN) relative to the reference clock at the egress node. Note that the rate of the OTN is a multiple of (directly derived from) the reference clock at the ingress node. For reference, this system can be seen in FIG. 7. This mode of operation is labeled "B and C mode" since there are packet size indications for the carrier (B indications) and for the client (C indications).

As mentioned, the main inputs to the ACB are the packet size indications. These indications are used by the ACB at precise intervals (counted as a specific number of reference clocks). However, it is possible that they can arrive from the packet monitor with variable timing since the packet monitor is counting packet payload bytes in the packet domain. For example, there may be a variable time between packets due to packet delay variation through a packet switching fabric. To compensate for the delay variation, the incoming packet size indications are placed in a small FIFO so that there is always one available when required. It is guaranteed by design that the average rate of packet size indications coming into the FIFO is exactly the same as the average rate that they are removed.

Figure 12:
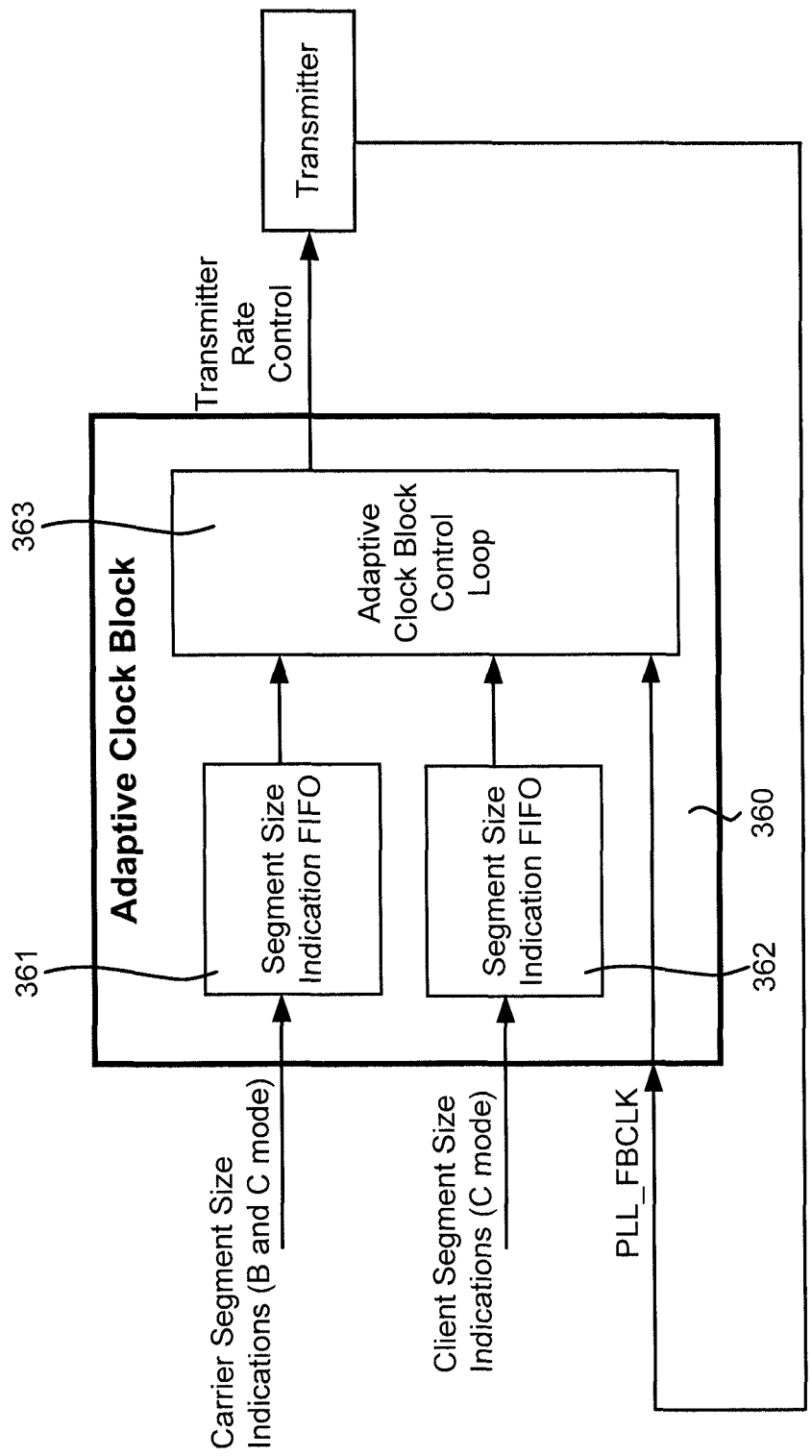
FIG. 12 illustrates an Adaptive Control Block (ACB) with the two input packet size indication FIFOs as well as the feedback control loop, according to an embodiment of the disclosure

FIG. 12 shows a block diagram of the ACB with the two input packet size indication FIFOs as well as the feedback control loop, according to an embodiment of the disclosure. When the ACB is in C mode, only the client packet size indications are used, as there is no need to deduce the ingress clock rate (as it is the same clock as for the egress clock rate). Accordingly, the B input can be (effectively) disabled, as there is no carrier rate to deduce. When B and C mode is enabled, both carrier (B) and client (C) size indications are used.

The exemplary ACB 360 shown in FIG. 12 comprises Segment Size Indication FIFO 361, which receives the carrier segment size indications (indicative of the variation of said carrier CBR clock stream from a nominal carrier relative to said local reference clock) from the rate measurement block 150, a Segment Size Indication FIFO 362, which receives client size indications indicative of variations in the size of said segments from the segment block 350; and a ACB control loop 363 which produces a transmitter rate control signal to adjust a local reference clock which causes the transmitter 330 to match said client CBR rate, such that the client CBR stream is output at said client CBR clock rate. The ACB control loop receives, as a 3rd input, an PLL feedback clock from the transmitter 330.

According to an embodiment of the disclosure, the transmitter rate control is a 20 bit signed digital value. This value is interpreted by the transmitter as an indication to speed up or slow down its output clock frequency. In this embodiment, the signed output value is used to control the feedback divider of a fractional-N Clock Synthesizer inside the transmitter block. However, the disclosure is not limited to this specific architecture and multiple other embodiments can be achieved in other implementations. For example, the digital output can be put through a Digital to Analog Converter (DAC) to drive a Voltage Controlled Oscillator (VCO) directly. Another implementation is that the DAC can drive an external Voltage Controlled Crystal Oscillator (VCXO) running at the output clock rate. In such alternative embodiments, the gain of the control loop may need to be adjusted to account for the gain of the VCO or VCXO, but this does not alter the basic premise of the disclosure.

When controlling the transmitter for CBR data leaving a packet switching element, the ACB is in C mode. In this mode, the ACB receives packet size indications from only one packet monitor on the outgoing client CBR data. These packet sizes were generated by the rate measurement block at the ingress node which compared the incoming CBR rate to the reference clock. The rate measurement was performed using two parameters, the measurement time (PKT_PERIOD) in units of reference clock periods and the number of expected CBR bytes (PKT_SIZE) during the measurement time.

Figure 13:
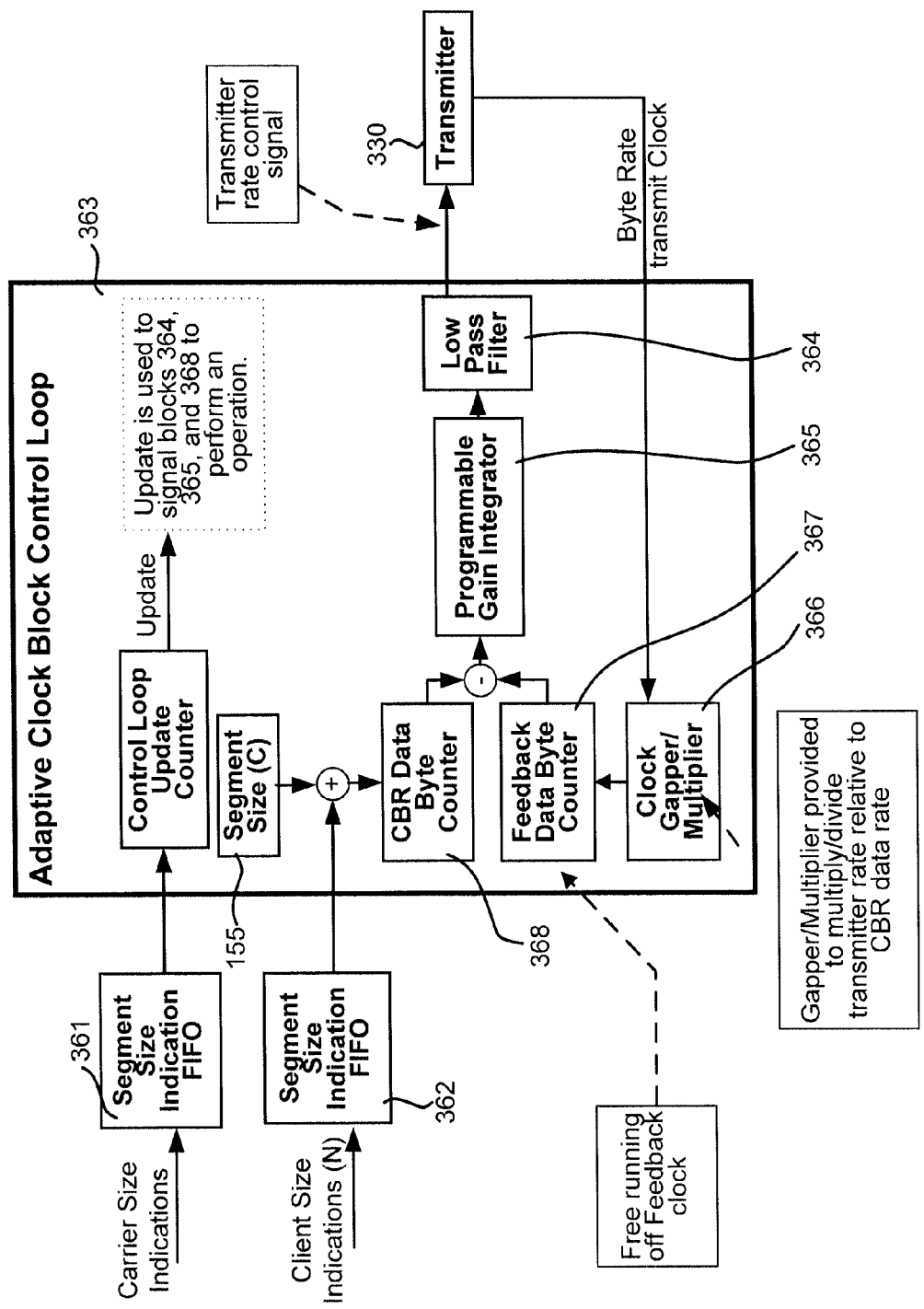
FIG. 13 illustrates an ACB control loop according to an exemplary embodiment of the disclosure.

To regenerate the CBR data stream at the egress port, the ACB uses the same parameters as the rate measurement block. As well, the ACB has a similar control loop to the rate measurement block. The ACB control loop is shown in FIG. 13. In this case, the input is the packet size indications from the upstream blocks, such as provided to the segment size indication FIFO 362. The indications are added to the PKT_SIZE parameter, shown in FIG. 13 as segment size (C) 155, to give the number of bytes seen at the rate measurement block during a given PKT_PERIOD. This value is fed into a CBR data byte counter 368 which is also updated every PKT_PERIOD reference clocks.

In the feedback path, the transmitter sends back its byte rate transmit clock to a feedback data counter 367. The feedback byte counter 367 provides a measure of exactly how many bytes were sent out. Like the rate measurement block, the difference between the two counters is sampled every PKT_PERIOD reference clock cycles and then integrated by a variable gain integrator, shown in FIG. 13 as a programmable gain integrator 365.

Lastly, the output of the integrator 365 is low pass filtered in a low pass filter 364 such that it is very stable over time. If the ACB output varied greatly over time, the transmitter 330 will generate unwanted jitter on the output CBR data stream. The output of the low pass filter 364 is actually the value $\epsilon_{act}$ (from the rate measurement block) converted to units understood by the transmitter. Since the incoming packet indications are quantized to +1, 0, and −1 the low pass filter smoothes out the transitions and finds the time average of the packet indications ($\epsilon_{act}$).

Like the rate measurement block both PKT_PERIOD and PKT_SIZE are integer parameters into the control loop. However, the relative rates of the reference clock and the CBR data are not integer multiples and in the general case the ratio is irrational. Therefore, for nominal clock rates we again have a nominal error in the PKT_SIZE value, $\epsilon_{nom}$, as was shown in Equation 2. Similarly, we get $\epsilon_{act}$ for the actual received CBR data stream as shown in Equation 5. It is this value $\epsilon_{act}$ encoded in the packet size indications and that is received by the ACB and used as the input to the ACB control loop. Any difference between $\epsilon_{act}$ and $\epsilon_{nom}$ indicates a PPM difference between the nominal client and the actual client and will cause the ACB to adjust the frequency of the output clock to match the PPM difference.

As $\epsilon_{act}$ varies over time because the relative frequencies of the local reference clock and the CBR data stream change, the ACB will adjust the frequency of the transmitter generated clock to match that of the original CBR data stream at the ingress port.

For additional functionality, a clock gapper/multiplier 366 is implemented as part of the free running feedback clock counter to do simple fractional division/multiplication of the feedback clock. The clock gapper/multiplier 366 is available in case the CBR stream measured at the ingress port is not the same rate as the CBR output at the egress port. This situation can arise if additional data is added to the CBR stream or if data is removed from the CBR stream somewhere in the data path. For example, additional data can be added during packet switching for error correction such as FEC, CRC, or ECC. In this case, the transmitter 330 can be configured to nominally run at the rate of the CBR data with additional overhead and the gapper 366 is enabled to bring the data rate back down to the originally measured CBR data rate.

Conversely, when data is removed from the CBR stream between measurement and regeneration, the transmitter 330 can be configured for the reduced data rate and the multiplier used to multiply the clock frequency back up to the original CBR rate.

In one preferred embodiment, the gapper/multiplier 366 is a simple first order DSM capable of handling both positive and negative numbers. When the numerator is positive and the output of the DSM is a positive rollover, the gapper forces the feedback clock counter to skip a count, thereby reducing the frequency of the feedback clock. Alternatively, when the numerator is negative and the output of the DSM is a negative rollover, the multiplier will force the feedback counter increment by two clocks rather than one. This effectively increases the frequency of the feedback clock Using a Delta-Sigma Modulator to drive the gapper/multiplier logic is not required by the present disclosure. Other implementations that perform an equivalent function can be substituted for the DSM without adversely affecting the overall functionality of embodiments of the disclosure. As well, rather than using a clock gapping/multiplication function in the feedback counter to do the multiplication/division, other methods can be used including fractional-N clock synthesizers and other circuits.

Adaptive Clock Block Feedback Loop Equations will now be described, which may be useful in understanding embodiments of the disclosure.

The loop characteristics of the ACB can be derived using linear approximations of the individual elements. The difference between the feedback counter and the CBR data byte counter is fed to a programmable gain integrator whose transfer function can be seen in Equation 12.

$$K(s) = \frac{A}{s} \qquad \text{Equation 12}$$

The next element in the loop is a simple low pass filter. In the preferred embodiment, this low pass filter is implemented using an exponentially weighted moving average filter. However, this implementation is not critical to this embodiment of the disclosure and any low pass filter implementation is sufficient. The transfer function of a low-pass filter is shown in Equation 13 and sufficiently models our implementation. The bandwidth (cutoff frequency) of the low pass filter is a function of the parameter $\tau_f$ and in our embodiment is programmable such that the overall loop characteristics are adjustable.

$$F(s) = \frac{1}{1 + \tau_f s} \quad \text{Equation 13}$$

The final piece of the loop is the transmitter fractional-N clock synthesizer. Although, this element is not in the ACB, it forms a part of the control loop and is therefore included. As shown in Equation 14, the output of the clock synthesizer is a function of the input reference clock, the feedback divider ratio and the output divider ratio.

$$f_{out}(t) = \frac{\left(N + \frac{R + S(t)}{Q}\right)}{(\text{bits/byte})} f_{ref} \quad \text{Equation 14}$$

One embodiment of the fractional-N clock synthesizer has as inputs three constants N, R, and Q and one variable S(t). The control output from the ACB is S(t) in Equation 14. Finally, since the ACB counters are running off a byte clock, we divide by the number of bits per byte. Taking the Laplace transform of Equation 14 gives us the transfer function of the clock synthesizer as shown in Equation 15. As the equation illustrates, the clock synthesizer acts as a constant gain in the loop.

$$\frac{f_{out}(s)}{S(s)} = \frac{f_{REF}}{(\text{bits/word}) \cdot Q} = K_{VCO} \quad \text{Equation 15}$$

Using the generic feedback system shown in FIG. 10 and the associated transfer function as shown in Equation 8, we can derive the characteristics of the ACB loop. In the adaptive clock block phase adaptation control loop, H(s)=1, and G(s)=K(s)·F(s)·$K_{VCO}$. Therefore, the overall transfer function of the system is derived in Equation 16 which shows a typical second order response.

$$T(s) = \frac{G(s)}{1 + G(s)H(s)} = \frac{K_{VCO} \cdot K(s) \cdot F(s)}{1 + K_{VCO} \cdot K(s) \cdot F(s)} \quad \text{Equation 16}$$

$$T(s) = \frac{\left(\frac{K_{VCO} \cdot A}{s(1 + \tau_f s)}\right)}{1 + \left(\frac{K_{VCO} \cdot A}{s(1 + \tau_f s)}\right)} = \frac{K_{VCO} \cdot \frac{A}{\tau_f}}{s^2 + \frac{s}{\tau_f} + \frac{K_{VCO} \cdot A}{\tau_f}}$$

$K_{VCO}$ is fixed for our fractional-N clock synthesizer, while the parameters $\tau_f$ and A are programmable enabling the ACB to be very flexible for different data rates and applications.

When transporting CBR clients over that WAN, both the B and C packet size indications are used to recover the CBR data stream phase information. In this case, the C packet sizes indicate the relative rate of the CBR client to the ingress node's reference clock (and therefore the CBR client rate relative to the OTN carrier rate or the SONET Path layer (SDH High-Order Path layer) carrier rate). As shown in FIG. 7, a second rate measurement block is added to the system in the egress node. This rate measurement block is measuring the rate of the incoming carrier (OTN) and outputting our B packet size indications to the ACB.

The OTUk generated by the ingress node uses the ingress node reference clock as its timing reference. As per the G.709 specification, in OTN networks, the phase of the generated OTN is maintained through the network, irrespective of the number of nodes it passes through. Therefore, the B packet size indications indicate the relative rate of the carrier, and therefore the ingress node reference clock to the egress node's reference clock. With these two pieces of information, we can derive the relative rate of the original CBR data stream to the egress node reference clock. This ratio is important since the egress node transmitter will be using the egress node reference clock as its timing source.

Like the C mode of operation, the original CBR rate relative to the ingress node reference clock is programmed using two parameters, the measurement time (PKT_PERIOD) in units of reference clock periods and the number of expected CBR bytes (PKT_SIZE) during the measurement time. These parameters are still applicable to the C packet size indications and are used in an analogous manner when B and C mode is enabled. If no other operations were performed (i.e. we ran C mode with CBR data coming in from the WAN) the ACB would calculate the relative rate of the CBR client to the ingress node reference clock, but this offset would be applied relative to the egress node's reference clock. Since the ingress node and egress node's reference clocks are different, doing this would lead to the CBR data output having the incorrect output frequency.

To compensate for the error, we use the B packet size indications to occasionally alter the value of PKT_PERIOD by +1 or −1 egress node reference clock cycles. If done correctly, changing the PKT_PERIOD duration occasionally is functionally equivalent to scaling the egress node reference clock to match the ingress node reference clock. Therefore, performing this function will allow us to exactly recreate the CBR client data rate at the egress node.

As mentioned previously, in the general case, the carrier rate will not be an integer multiple of the local reference clock which leads to $\epsilon_{nom}$ in the carrier packet indications. To ease implementation, it is advantageous to monitor the accumulation of carrier phase directly. In this case we would like to find the value $\xi_{diff}$ as shown in Equation 17 which is the difference between $\epsilon_{act}$ and $\epsilon_{nom}$.

$$\epsilon_{diff} = \epsilon_{actual} - \epsilon_{nom} \quad \text{Equation 17}$$

If we obtain $\epsilon_{diff}$ the integral of the packet size indications is a direct measurement of the phase difference of the incoming carrier to a nominal carrier relative to the egress node reference clock. To obtain $\epsilon_{diff}$ an $\epsilon$ predictor is added to the system. This predictor can be added anywhere between the carrier's rate measurement block and the B packet size indication input of the ACB. In the preferred embodiment the $\epsilon$ predictor is located in the packet monitor and inserts additional packet size indications equal to negative $\epsilon_{nom}$. In this way, using Equation 17, the addition of the rate measurement output and the predictor is equal to $\epsilon_{diff}$. The disclosure is not limited to this implementation. Alternatively, the predictor can subtract $\epsilon_{nom}$ from the packet indications generated by the data rate monitor directly. Also, it is not important whether the predictor is in the packet monitor, between the packet monitor and the ACB, or in the ACB itself.

A particular embodiment of the predictor uses a first order DSM implementation. Constant inputs configure the DSM to output a value of negative $\epsilon_{nom}$ (time averaged). The DSM output is added to the incoming B packet size indications such that the value going into the control loop is $\epsilon_{diff}$. Using the DSM gives flexibility for different carrier rates and different reference clock frequencies. However, the DSM implementation of the predictor is not a requirement and other implementations are suitable for this disclosure including fixed pattern generators or lookup tables that contain an average value of $\epsilon_{nom}$.

Once $\epsilon_{diff}$ is available, it is used to modulate the PKT_PERIOD in such that the egress node reference clock looks equivalent to the ingress node reference clock. There is a slight complication in that $\epsilon_{diff}$ is in units of carrier bytes. For example, if we feed the stream of B packet size indications into a simple integrator, when the integrator value reaches one, we know that we have received one extra byte of carrier data relative to the local reference clocks view of the carrier rate. However, we are using the B packet size indications to alter the loading of the ACB control loop which is measured in units of reference clocks. Therefore, a conversion function between carrier bytes and reference clocks is needed.

The conversion function may be more easily understood using a concrete example. Assume that the carrier is ODU2 and that the ACB reference clock is running at 311.04 MHz. Equation 18 shows the frequency of the ODU2 byte rate clock relative to a SONET data stream (as defined in G.709, which is incorporated by reference in its entirety).

$$ODU2 = \frac{9953.28 \frac{\text{Mbits}}{\text{sec}} * \left(\frac{239}{237}\right)}{8 \frac{\text{bits}}{\text{byte}}}$$

$$ODU2 = 1244.16 \left(\frac{239}{237}\right) \frac{\text{MBytes}}{\text{sec}}$$

Equation 18

Given Equation 18, the ratio reference clocks to carrier clocks is shown in Equation 19. From this equation we can see that if we received 956 extra bytes of carrier ODU2 (i.e. 956 extra "+1" packet size indications), we would want to alter the loop filter PKT_PERIOD count by 237 reference clocks. It may not be desirable to wait for the accumulation of 956 bytes of carrier before acting as this would generate an extremely large phase hit on the output clock. However, this provides insight into embodiments of the present disclosure and its implementation.

$$\frac{ODU2}{refclk} = \frac{1244.16 \left(\frac{239}{237}\right) \frac{\text{Mbytes}}{\text{sec}}}{311.04 \text{ MHz}}$$

$$\frac{ODU2}{refclk} = 4\left(\frac{239}{237}\right) = \frac{956}{237}$$

or $$refclk = ODU2\left(\frac{237}{956}\right)$$

Equation 19

Continuing our example, if we receive one extra carrier packet size indication (an extra +1) we need to adjust the PKT_PERIOD by 237/956 reference clocks. To implement this translation, we use a modulus 956 accumulator followed by another Delta Sigma Modulator (DSM). Each B+1/B−1 packet size indication causes the modulus accumulator to add/subtract 237. If the accumulator rolls over, it causes the PKT_PERIOD counter to count by two instead of one for one reference clock. If the accumulator rolls under, the PKT_PERIOD counter will not increment for one reference clock cycle. Therefore, whenever the accumulator rolls over or rolls under it causes the C interface to be read earlier or later by one reference clock cycle. This change in when we load is "permanent".

As mentioned, the current value of the accumulator is fed as the numerator into a DSM with a denominator of 956. The output of the DSM will be a stream of zeros and ones whose long term average is equal to the numerator divided by the denominator (a real number between 0 and 1).

The DSM output is used to temporarily modulate when the C packet size indication is loaded to simulate a fractional loading time. When the output is zero, the C packet size indication is read when the PKT_PERIOD counter is at a value of 1 which is the nominal loading time. When the output of the DSM is one, the C packet size indication is read when the PKT_PERIOD counter is a value of 0 (i.e. when the DSM output is 1, the C interface is temporarily read "early" by one reference clock cycle). Because the time average output of the DSM is equal to the time average of the loading time, this effectively allows the loading time to be a fractional value between zero and one.

Consider the following scenario using our example with ODU2 as the carrier. At time t=0, the mod 956 accumulator is equal to zero. The DSM output will be zero all the time (time average is zero) and the PKT_PERIOD counter will always load when it is equal to one. Some time later, we detect a B+1 event so 237 is added to the accumulator. The accumulator value of 237 is fed to the DSM and its average output over time should be 237/956 (slightly less than ¼). The DSM will output a one approx once every 4 triggers (PKT_PERIOD counter rollovers). This means that approx one time out every four, the C packet size indication load will occur early by one REFCLK period. In this case, we can average and say that the loading time is at approximately ¼ of a reference clock cycle which is the desired time.

If over time we accumulate three more B+1's, the accumulator will have a value of 4*237=948. Now, the average DSM output will be 948/956=0.9916. The DSM will output a one approx 99% of the time which will cause 99% of the C interface reads to be early by one REFCLK period and our loading time is 99% of one reference clock cycle. Again, this is exactly what we want.

At the fifth B+1 event, the MOD 956 counter will rollover causing the PKT_PERIOD counter to increment by 2 for one reference clock cycle. Therefore, all future phase dumps will be early by a reference clock cycle. At this point, the accumulator will have value 229 and the DSM will output a one approx 24% of the time. Relative to time t=0, 24% of the phase dumps will be early by two reference clock cycles and 76% are early by one reference clock cycle. Meaning the average loading time is ~1.24 reference clock cycles early.

Continuing this methodology effectively causes the PKT_PERIOD counter to be relative to the ingress node reference clock rather than the egress node reference clock. In this scenario, we are back to the situation described in the C mode of ACB operation and this is exactly what occurs in the implementation of our disclosure. Once again, the output CBR data will again be exactly equivalent to the incoming CBR stream at the mapping node even after having been packetized and transported over the WAN.

The methodology described in the above example is extensible to other reference clock frequencies as well as other carrier frequencies provided that the ratio of the reference clock to the carrier clock can be represented by N/Q, and there is enough resolution in the accumulator and DSM to represent the values N and Q.

Figure 14A:
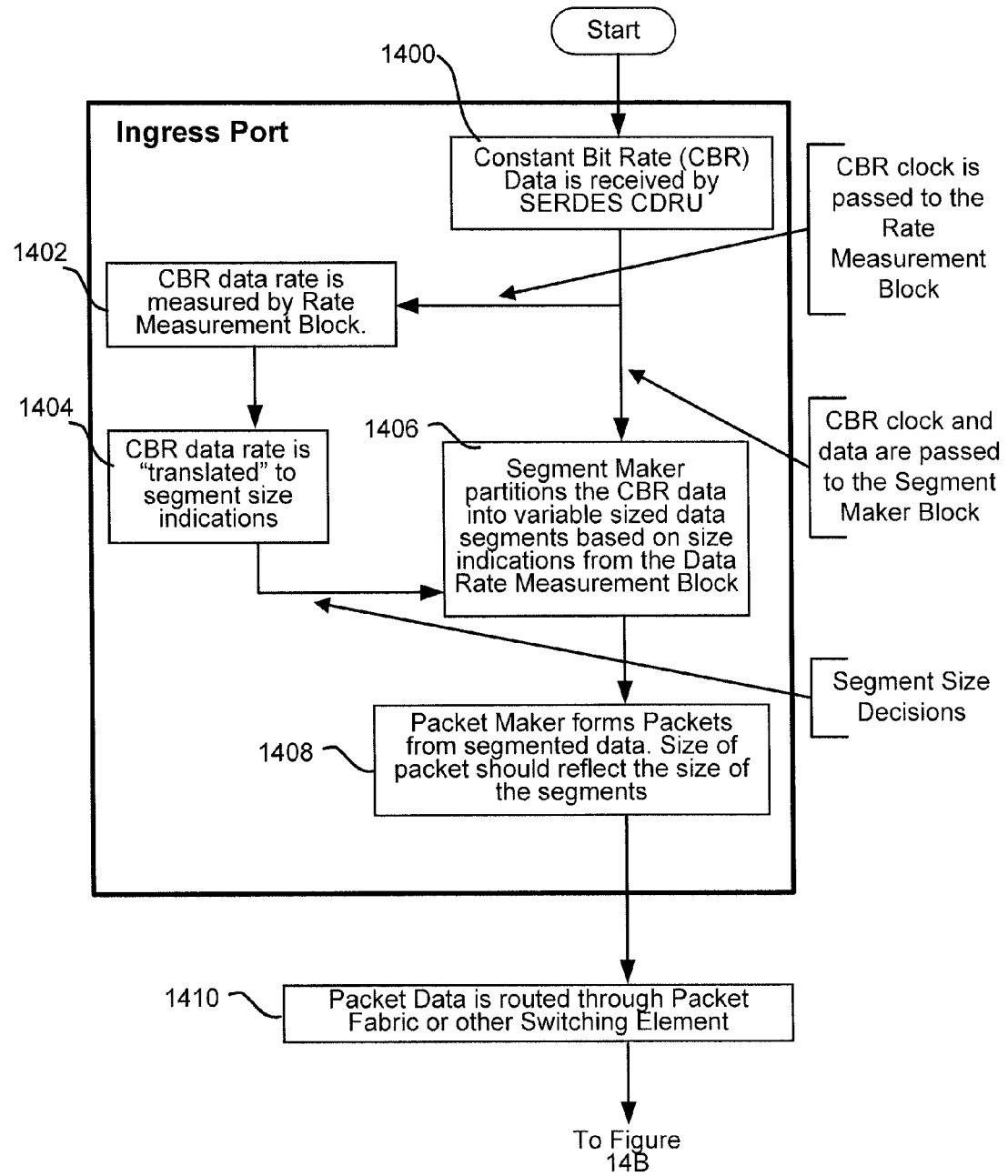
FIG. 14A and FIG. 14B show a non-limiting, exemplary flow chart which illustrates steps carried out by the apparatus of FIG. 5.
Figure 14B:
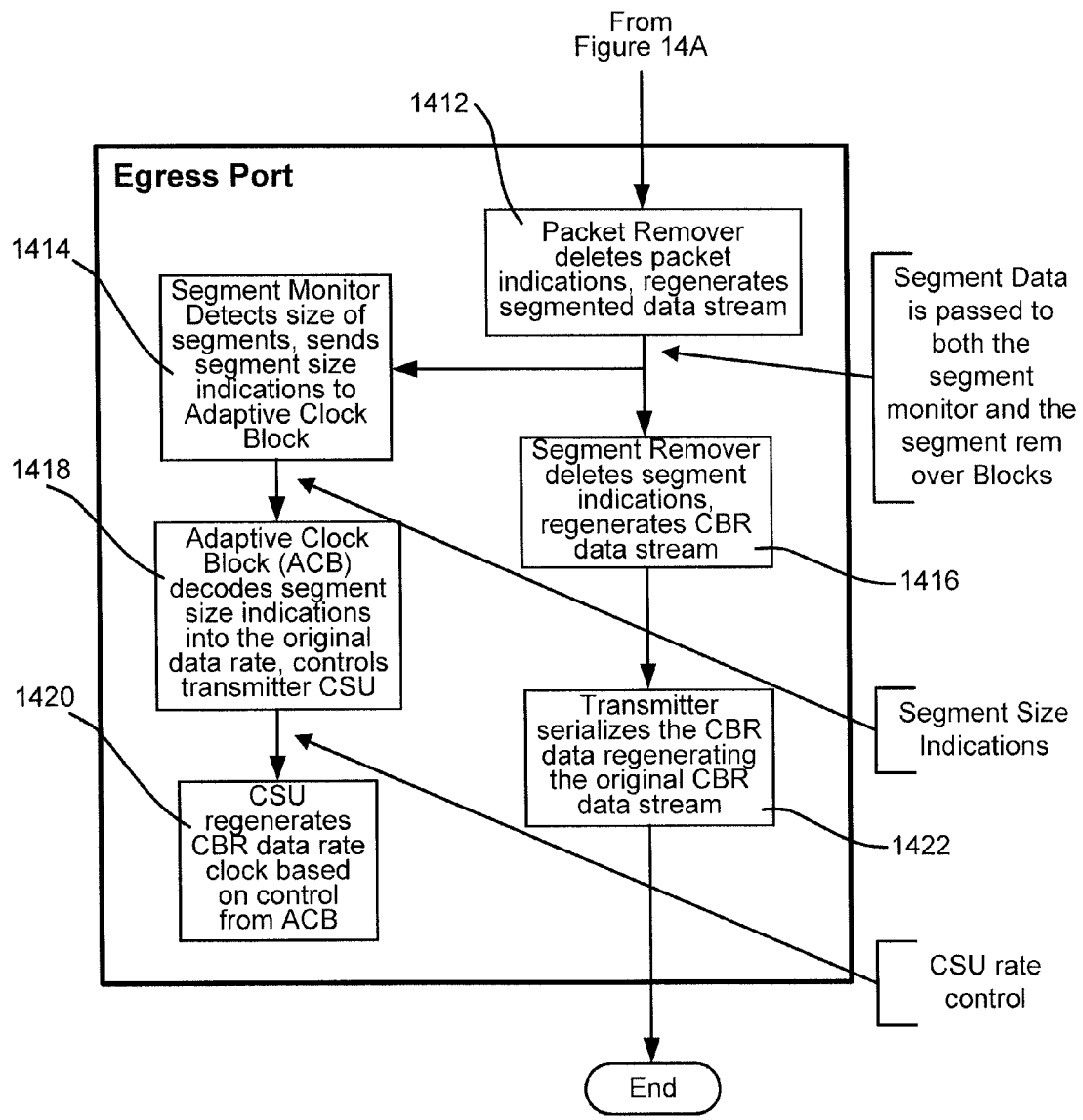

FIGS. 14A and 14B show an exemplary flow chart illustrating the steps that can be carried out by the embodiment of the disclosure shown in FIG. 5. In FIG. 14A at step 1400, CBR data is received by the SERDES CDRU. CBR clock is then passed to and measured by the Rate Measurement Block at step 1402. The CBR data rate is then "translated" to segment size indications at 1404. CBR clock and CBR data are passed to the Segment Maker Block, and, at step 1406, the Segment Maker partitions the CBR data into variable sized data segments based on size indications from the Rate Measurement Block. The Packet Maker then forms packets from the segmented data 1408. The size of the packets reflects the size of the segments. Next, at 1410, the packet data is routed through the packet fabric or other switching element. The method then proceeds to FIG. 14B.

In FIG. 14B, the Packet Remover at 1412 then deletes packet indications and regenerates the segmented data stream, which is passed to both the Segment Monitor Block and the Segment Remover Block. The Segment Remover, at 1416, deletes segment indications and regenerates the CBR data stream, while at 1414, the Segment Monitor detects the size of the segments and sends size indications to the Adaptive Clock Block. The Adaptive Clock Block, at 1418, then decodes the segment size indications into the original data rate, and controls the transmitter CSU. The CSU then, at 1420, regenerates CBR data rate clock based on the CSU rate control received from the Adaptive Clock Block. Finally, at 1422, the Transmitter serializes the CBR data, regenerating the original CBR data stream.

Figure 15A:
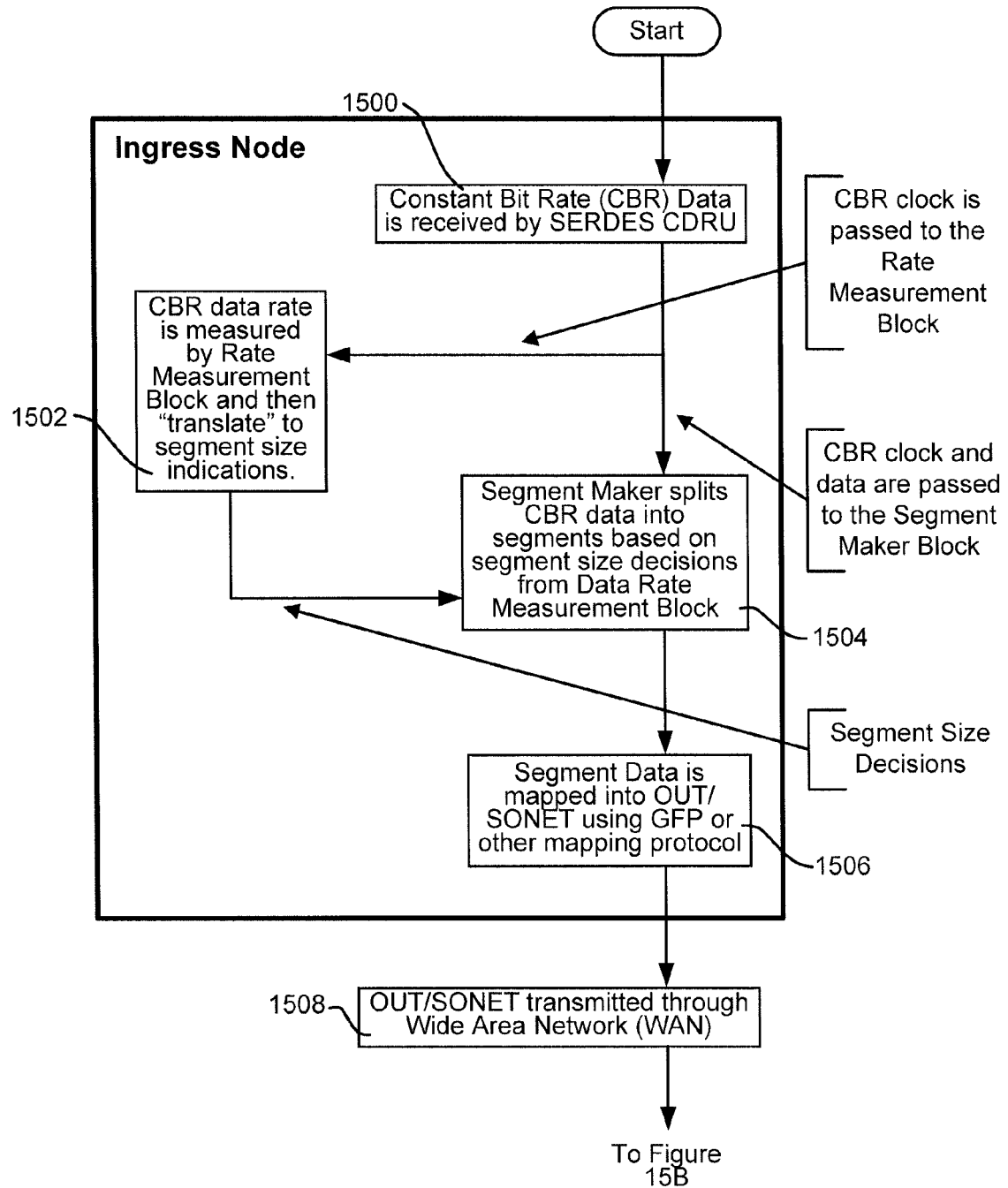
FIG. 15A and FIG. 15B show a non-limiting, exemplary flow chart which illustrates steps carried out by the apparatus of FIG. 7.
Figure 15B:
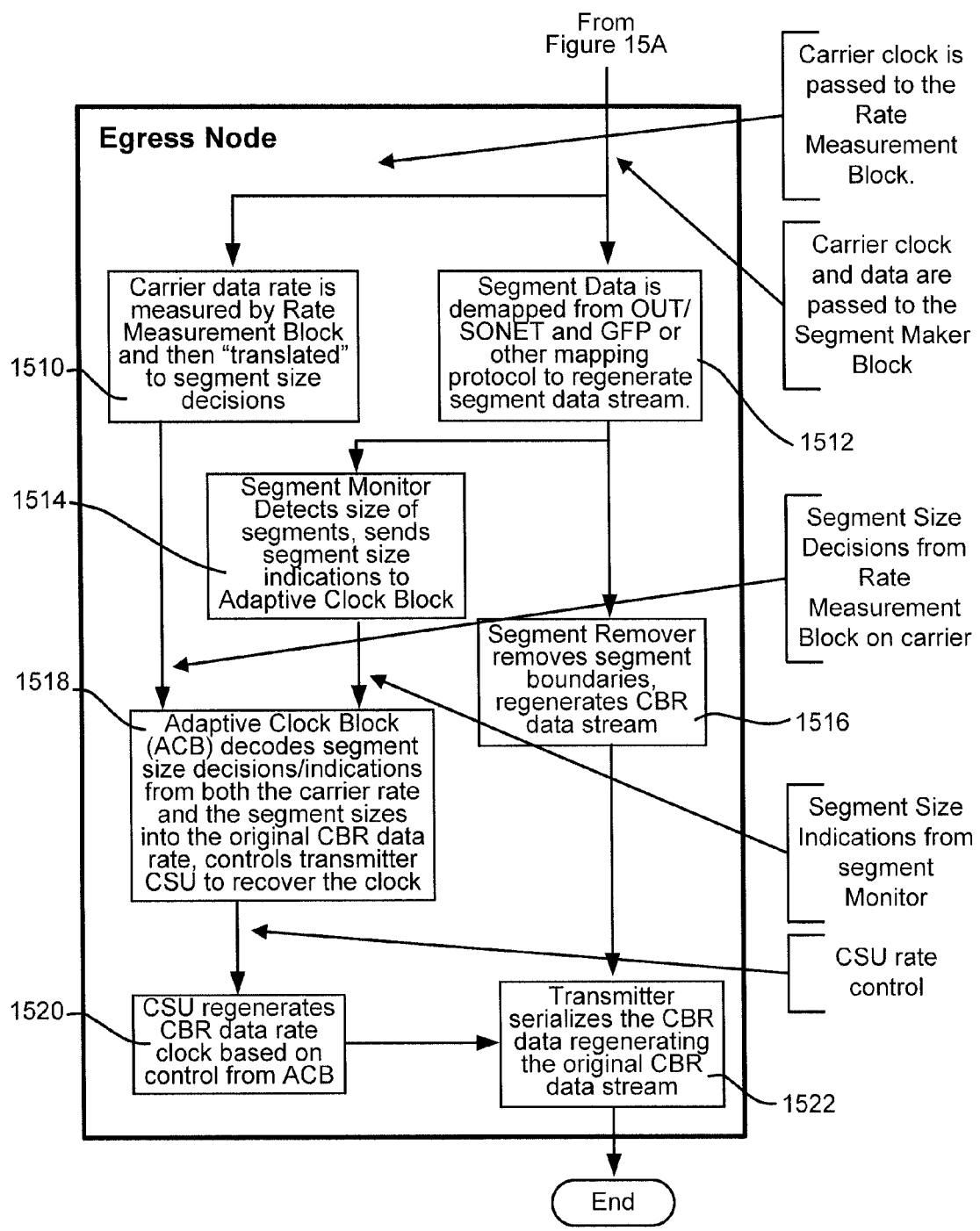
Figure 16:
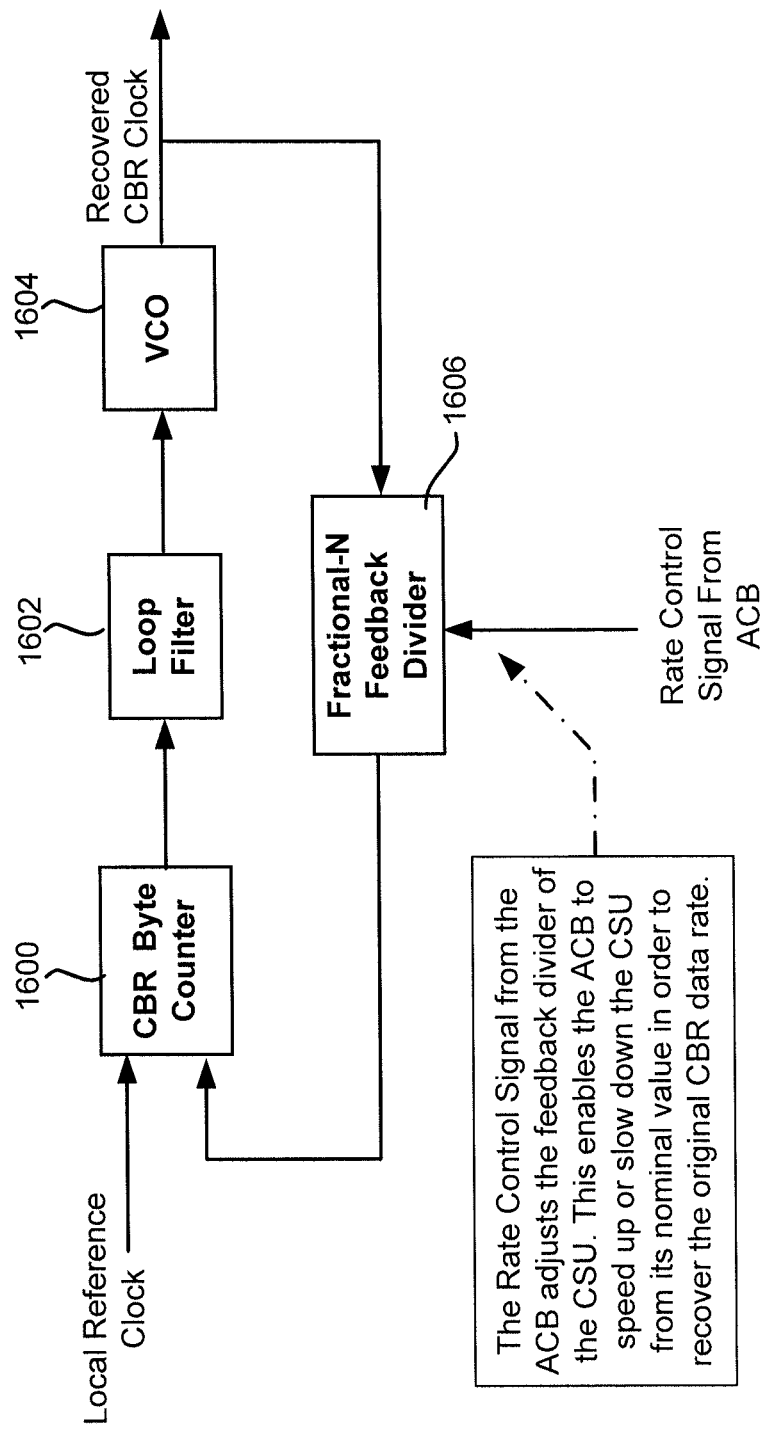
FIG. 16 shows a block diagram of the transmitter according to an embodiment of the disclosure.

FIGS. 15A and 15B show an exemplary flowchart of the steps that can be carried out by the embodiment of the disclosure shown in FIG. 7. In FIG. 15A, at 1500, CBR data is received by the SERDES CDRU. CBR clock is then passed to the Rate Measurement Block, which measures it and "translates" it into segment size indications at step 1502. These segment size decisions as well as CBR clock and data are passed to the Segment Maker Block. At 1504, the Segment Maker splits CBR data into segments based on the segment size decisions received from the Rate Measurement Block. Then, at 1506, the segment data is mapped into OTU/SONET using a mapping protocol such as GFP which is then transmitted 1508 through a WAN to the Egress Node. The method then proceeds to FIG. 15B.

In FIG. 15B, at the Egress Node, the carrier clock and data are passed to the Segment Maker Block while the carrier clock is passed to the Rate Measurement Block. At 1510, the carrier data rate is measured by the Rate Measurement Block and then "translated" to segment size decisions. At 1512, the segment data is demapped from the OTU/SONET and whatever mapping protocol was employed at 1506 (in this example, GFP), thus regenerating the segment data stream. The Segment Monitor at 1514 then detects the size of the segments and sends segment size indications to the Adaptive Clock Block, while at 1516, the Segment Remover removes segment boundaries and regenerates the CBR data stream. The segment size indications from both the carrier rate and the segment sizes are decoded by the Adaptive Clock Block at 1518 into the original CBR data rate. The ACB also controls the transmitter to recover the clock. At 1520, CSU regenerates CBR data rate clock based on control received from the ACB. Finally, at 1522, the Transmitter serializes the CBR data, thus regenerating the original CBR data stream.

It should be noted that there is substantial overlap between the network element embodiment of FIGS. 5 and 14A & 14B with the network embodiment of FIGS. 7 and 15A & 15B, in the sense that both utilize the segment size indications to recreate the CBR data stream at the CBR clock rate. However, one significant difference is that within the network element, as both cards are within the same element, both the ingress card and the egress card share the same reference clocks; whereas in the network example, the ingress node and the egress node use difference reference clocks.

When the Packet Maker makes packets, it uses the number of bytes received in successive T cycles of the local reference clock to determine packet sizes. Thus, the local reference clock can be thought of a the yardstick for making measurements. An egress node needs to know what manner of reference clock was used at the ingress node in order to properly evaluate the sequence of sizes.

In the fabric application, both the ingress linecard and the egress line card share a common local reference clock. There is no need for the egress linecard to try to deduce what the ingress card used as its measurement reference.

In the network application, the egress node needs to deduce what the ingress node used for its local reference clock. Otherwise, if the packet sizes are consistently small, it would be difficult to know if this was because the client is slow or because the ingress node had a faster than normal reference clock. Similarly, if the clock is fast, T cycles of it would span a shorter time, and thus fewer client bytes would arrive over this shorten span. To differentiate between slow client and fast reference clock at the ingress, we look at the carrier to see if it is faster or slower than expected, using the reference clock at the egress node.

The following section describes this aspect in more detail by illustrating the difference in the applications between the CBR stream packetized for transmission over a fabric vs being mapped onto a CBR Carrier In the fabric example, the Ingress and Egress elements share the same reference clock. So at the Ingress card, packets of varying sizes dependent on the clock rate of the client CBR are constructed, with 1 packet made every $T_c$ cycles of ref clock, on average. The client packets are then transported from the ingress element to the egress via the fabric. The characteristics of the path are unimportant. At the egress card, packets are received and the client packet size indications are placed into a FIFO, which is read once every $T_c$ cycles. These packet size indications are then used by a phase detector in the $T_x$ clock controller to reconstruct the CBR data stream.

In the network example, the Ingress and Egress elements do NOT share the same reference clock. Once again the Ingress element makes packets of varying sizes dependent on the clock rate of the client CBR are constructed, with 1 packet made every $T_c$ cycles of ref clock, on average. The packets are then transmitted from ingress element to the egress by being mapped into a CBR Carrier. Upon receipt, the egress element makes packets of varying sizes of the CBR Carrier, with 1 packet made every $T_b$ cycles of the egress ref clock, on average. It should be noted that in general $T_c$ is not equal to $T_b$.

The exemplary systems described herein have several advantages over the prior art, which may include the following: 1) Lower jitter and wander. The embodiments described herein are not subject to waiting time jitter due to packet delay variation; 2) Low overhead. Since the phase information is encoded in the packet size, no overhead is required which can increase the available signal bandwidth; 3) Flexibility. The embodiments described herein are not tied to specific reference clocks or data rates. Many combinations of reference clock and data rate is possible; and 4) Portability. There is no requirement that the mapping node and demapping node have stratum traceable reference clocks as embodiments of disclosure are capable of compensating for the difference in reference clocks. 5) Compatibility. Since our implementation only uses packet size variation to indicate phase of the client signal, other devices using different timing recovery schemes can interoperate with our system. This wouldn't be possible if we included additional control information in the datapath as the other device wouldn't understand or have knowledge of our format.

Transporting CBR clients over packet networks is becoming more and more prevalent. In many cases, the phase of the CBR clients is critical to the operation of the equipment receiving the CBR signal. We have discussed embodiments of the disclosure with respect to packet switching network elements and transmission of CBR data over a SONET or OTN WAN.

However, the disclosure is not limited to these specific applications and can be expanded to include: loop timing, line timing, and through timing at a network element. In this example, the incoming CBR phase is used as the timing source of a different outgoing CBR signal (which is potentially at a different clock frequency); different WAN carrier protocols including but not limited to SONET/SDH, OTN, and synchronous Ethernet; different mapping protocols of the CBR client into the carrier. Including, but not limited to GFP, synchronous OTN mapping, asynchronous OTN mapping, and Ethernet; virtual concatenation of the carrier between the mapping and demapping nodes; virtually any CBR clients as our disclosure does not require any fixed relationship between the CBR client and the reference clock; virtually any reference clock frequency as our disclosure does not require any fixed relationship between the reference clock and the CBR client; different reference clock frequencies at the ingress and egress (mapper and demapper) nodes, provided the relationship of the clocks is known during implementation; various SERDES designs with different control mechanisms than that of the current embodiment; or combination or separation of the individual components. For example, the packet maker block can be combined with the rate measurement block. The adaptive clocking block can be combined with the SERDES CSU. Other combinations are possible.

The disclosure is not limited to the transportation of packets. The rate measurement block can be combined with the Adaptive Clock Block. In this scenario, the rate measurement block packet size indications would control the ACB directly without the intermediate step of packet maker. This situation would be useful in a loop-timing SERDES application.

In the preceding description, for purposes of explanation, numerous details are set forth in order to provide a thorough understanding of the embodiments of the disclosure. However, it will be apparent to one skilled in the art that these specific details are not required. In other instances, well-known electrical structures and circuits are shown in block diagram form in order not to obscure. For example, specific details are not provided as to whether the embodiments of the disclosure described herein are implemented as a software routine, hardware circuit, firmware, or a combination thereof.

Embodiments of the disclosure can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described disclosure can also be stored on the machine-readable medium. Software running from the machine-readable medium can interface with circuitry to perform the described tasks.

The above-described embodiments of the disclosure are intended to be examples only. Alterations, modifications and variations can be effected to the particular embodiments by those of skill in the art without departing from the scope of the disclosure, which is defined solely by the claims appended hereto.

What is claimed is:

1. A method for transporting a constant bit rate (CBR) data stream comprising:

at an ingress element:
measuring a CBR clock rate for an input CBR stream and generating segment size decisions such that said segment size decisions vary dependent on said CBR clock rate;
dividing said CBR stream into variable size segments using said segment size decisions;
transmitting said variable size segments to an egress element; and at said egress element:
receiving said variable size segments;
determining size indications dependent on the size of each variable size segment; and
reconstructing said CBR stream from said variable size segments at a rate adjusted to match said CBR clock rate based on the variation in sizes of said size indications, wherein said measuring step comprises determining that said CBR clock rate is greater than, less than or equal to an approximated base CBR clock rate derived from a local reference clock and wherein said dividing step comprises sizing any given segment to be larger than, less than or equal to a base size indicative of said approximated base CBR clock rate, and wherein said approximated base CBR clock rate is defined using integers C and $T_{ref}$, where C is a base segment size in bytes and $T_{ref}$ is a number of local reference clock cycles such that said approximated base CBR clock rate in bits per second is given by $C*8/T_{ref}$.

2. The method as claimed in claim 1 wherein, over time, the variation in segment size decisions indicates variances between said CBR clock rate and said approximated base CBR clock rate.

3. The method as claimed in claim 1 wherein said measuring step utilizes a control loop configured to correctly compensate said segment size decisions for the difference between said approximated base CBR rate and said CBR clock rate, wherein said segment size decisions are determined every $T_{ref}$ clock cycles of said local reference clock, where $T_{ref}$ is an integer.

4. The method as claimed in claim 1 wherein said measuring step assigns the length of any given segment to be C+N bytes, C−N bytes or C bytes respectively, wherein N is an integer.

5. The method as claimed in claim 1 wherein said reconstructing step comprises outputting bits from said received segments at said CBR clock rate by outputting bits at a local egress clock rate adjusted based on said sizes of segments.

6. The method as claimed in claim 1, wherein a packet fabric is provided between said ingress and egress elements, said packet fabric being within a network element, and wherein said ingress and egress elements are ingress and egress cards respectively, and said ingress and egress cards share a common local reference clock.

7. The method as claimed in claim 1 wherein said ingress element is an ingress node, said egress element is an egress node and a CBR carrier network is provided between said ingress and egress nodes, said variable size segments being transported as client segments across said CBR carrier network via a carrier CBR signal,
   wherein said transmitting step comprises mapping said client segments into said carrier CBR signal,
   and at said egress node:
      said determining step comprises measuring client size indications indicating a rate of said client CBR signal, and further comprising,
      receiving said carrier CBR signal;
      measuring carrier size indications indicating a rate of said carrier CBR signal; and
      wherein said reconstructing step comprises outputting bits from said received client segments at said CBR clock rate by outputting bits at an egress node local reference clock rate adjusted based both on said client size indications and on said carrier size indications.

8. The method as claimed in claim 4 wherein, over time, the number of occurrences of C byte, C+N byte and C−N byte segments depends on the variance of said CBR clock rate from said approximated base CBR rate.

9. The method as claimed in claim 4 wherein said approximated base CBR clock rate is configured by programming the values C and $T_{ref}$.

10. The method as claimed in claim 4 wherein said approximated base CBR clock rate is automatically detected from said CBR stream and the values of C and $T_{ref}$ are automatically selected.

11. The method as claimed in claim 4 wherein N=1.

12. The method as claimed in claim 5 where said local clock rate is adjusted by fractional-N clock synthesis configured such that said output CBR stream from said egress element matches the frequency and phase of the original CBR data stream at said ingress element.

13. The method as claimed in claim 6 wherein the size of received segments are determined and written into a segment size FIFO, and read from said segment size FIFO every $T_{ref}$ cycles of said common local reference clock and enter a control loop which adjusts said fractional-N clock synthesizer to generate an egress CBR clock rate matching said CBR clock rate.

14. The method as claimed in claim 7 further comprising determining a relationship between an ingress node local reference clock and said egress node local reference clock using said carrier CBR size indications.

15. The method as claimed in claim 12 wherein said fractional-N clock synthesis uses a phase locked loop to adjust the rate of said local egress clock rate to match said CBR clock rate based on said size sizes of segments.

16. A method for transporting a constant bit rate (CBR) data stream comprising:
   at an ingress element:
      measuring a CBR clock rate for an input CBR stream and generating segment size decisions such that said segment size decisions vary dependent on said CBR clock rate;
      dividing said CBR stream into variable size segments using said segment size decisions;
      transmitting said variable size segments to an egress element; and
   at said egress element:
      receiving said variable size segments;
      determining size indications dependent on the size of each variable size segment; and
      reconstructing said CBR stream from said variable size segments at a rate adjusted to match said CBR clock rate based on the variation in sizes of said size indications;
   wherein said ingress element is an ingress node, said egress element is an egress node and a CBR carrier network is provided between said ingress and egress nodes, said variable size segments being transported as client segments across said CBR carrier network via a carrier CBR signal,
   wherein said transmitting step comprises mapping said client segments into said carrier CBR signal,
   and at said egress node:
      said determining step comprises measuring client size indications indicating a rate of said client CBR signal, and further comprising,
      receiving said carrier CBR signal;
      measuring carrier size indications indicating a rate of said carrier CBR signal; and
      wherein said reconstructing step comprises outputting bits from said received client segments at said CBR clock rate by outputting bits at an egress node local reference clock rate adjusted based both on said client size indications and on said carrier size indications; and
   wherein said transmitting step comprises mapping said client segments into said carrier CBR signal; and
   wherein said step of receiving said carrier CBR signal comprises:
      demapping said carrier CBR signal to output said client segments and placing said client segment size indications into a client size FIFO buffer, and
   wherein said reconstructing step comprises:
      deriving an egress CBR rate using said carrier CBR size indications and said client segment size indications;
      reading said client segment size indications once every $T_{ref}$ cycles of said ingress node local reference clock, wherein $T_{ref}$ is a number of local reference clock cycles; and
      adjusting said egress node local reference clock rate based on said carrier CBR size indications and said client segment size indications.

17. The method as claimed in claim 16 wherein said derivation step comprises:
   reading said carrier size indication FIFO every $T_{Bref}$ cycles of said egress node local reference clock,
   comparing the size indications with a sequence of carrier size indications generated from a carrier CBR stream whose rate is nominal compared to said egress node local reference clock, and
   using a result of said comparison to generate a series of integer values of $T_{Eref}$ such that, on average, $T_{Eref}$*egress reference clock periods=$T_{ref}$*ingress reference clock periods.

18. The method as claimed in claim 17 wherein, in said reading step, the reading of said client segment size indication FIFO is performed every $T_{Eref}$ cycles of said egress local reference clock, where $T_{Eref}$ is taken from said generated series of integer values $T_{Eref}$, and further comprising providing said client segment size indications as reference phase to a phase locked loop.

19. An apparatus for transmitting a constant bit rate (CBR) data stream, comprising:
  an ingress element including:
    a rate measurement block configured to measure a CBR clock rate for an input CBR stream and generate segment size decisions such that said segment size decisions vary dependent on said CBR clock rate;
    a segment maker configured to divide said CBR stream into variable size segments using said segment size decisions and to transmit said variable size segments; and
  an egress element including:
    a segment monitor configured to receive said variable size segments from said segment maker and to determine size indications dependent on the size of each variable size segment; and
    an adaptive clock block configured to decode said packet size indications into the original data rate and to control transmitter frequency relative to said local egress element reference clock such that the transmitter frequency matches the frequency and phase of the original CBR data stream at said ingress element;
  wherein said ingress element is an ingress node, said egress element is an egress node and a CBR carrier network is provided between said ingress and egress nodes, said variable size segments being transported as client segments across said CBR carrier network via a carrier CBR signal,
  wherein said rate measurement block comprises a client rate measurement block configured to measure client size indications indicating a rate of said client CBR signal, and further comprising:
    a mapper configured to map said client segments into said carrier CBR signal;
    a carrier rate measurement block configured to measure carrier size indications indicating a rate of said carrier CBR signal; and
    a carrier segment size indication FIFO configured to receive carrier segment size indications from said carrier rate measurement block;
    wherein said adaptive clock block is configured to output bits from said received client segments at said CBR clock rate by outputting bits at an egress node local reference clock rate adjusted based both on said client size indications and on said carrier size indications.

20. The apparatus as claimed in claim 19 wherein said rate measurement block comprises:
  a free running CBR byte counter configured to measure the exact amount of phase coming in on an input CBR data path;
  a feedback byte counter configured to count and increment a segment size once every Tref reference clock cycles;
  a loop filter configured to receive a difference of outputs of said CBR byte counter and said feedback byte counter; and
  a quantizer configured to receive an output of said loop filter and generate a new output value as said segment size indication to said segment maker, and as an output on a feedback path.

21. The apparatus as claimed in claim 19 further configured to map said client segments into said carrier CBR signal; and further comprising:
  a client size FIFO buffer;
  a demapper configured to demap said carrier CBR signal to output said client segments and place said client segment size indications into said client size FIFO buffer;
  wherein said adaptive clock block is configured to derive a relationship between an ingress node local reference clock and said egress node local reference clock using said carrier CBR size indications and said client segment size indications, to read said client segment size indications once every $T_{ref}$ cycles of said ingress node local reference clock, wherein $T_{ref}$ is a number of local reference clock cycles, and to adjust said egress node local reference clock rate based on said carrier CBR size indications and said client segment size indications.

22. The apparatus as claimed in claim 20 wherein said adaptive clock block (ACB) comprises:
  a client segment size indication FIFO configured to receive client size indications indicative of variations in the size of said segments from said segment monitor; and
  an ACB control loop configured to produce a transmitter rate control signal to adjust a local reference clock which causes said transmitter to match said client CBR rate, such that said client CBR stream is output at said client CBR clock rate.

* * * * *